US010535009B2

(12) United States Patent
Turner et al.

(10) Patent No.: US 10,535,009 B2
(45) Date of Patent: Jan. 14, 2020

(54) OPTIMIZING AUTOMATED MODELING ALGORITHMS FOR RISK ASSESSMENT AND GENERATION OF EXPLANATORY DATA

(71) Applicant: EQUIFAX INC., Atlanta, GA (US)

(72) Inventors: Matthew Turner, Cumming, GA (US); Michael McBurnett, Cumming, GA (US); Yafei Zhang, Alpharetta, GA (US)

(73) Assignee: EQUIFAX INC., Atlanta, GA (US)

(*) Notice: Subject to any disclaimer, the term of this patent is extended or adjusted under 35 U.S.C. 154(b) by 0 days.

(21) Appl. No.: 16/340,256

(22) PCT Filed: Nov. 7, 2016

(86) PCT No.: PCT/US2016/060805
§ 371 (c)(1),
(2) Date: Apr. 8, 2019

(87) PCT Pub. No.: WO2018/084867
PCT Pub. Date: May 11, 2018

(65) Prior Publication Data
US 2019/0340526 A1 Nov. 7, 2019

(51) Int. Cl.
*G06N 5/04* (2006.01)
*G06N 3/04* (2006.01)
(Continued)

(52) U.S. Cl.
CPC .............. *G06N 5/045* (2013.01); *G06N 3/04* (2013.01); *G06N 3/082* (2013.01); *G06N 20/00* (2019.01); *G06Q 40/025* (2013.01)

(58) Field of Classification Search
CPC ........ G06N 5/045; G06N 20/00; G06N 3/082; G06N 3/04; G06Q 40/025
See application file for complete search history.

(56) References Cited

U.S. PATENT DOCUMENTS 7,006,992 B1* 2/2006 Packwood ............ G06F 17/246
705/38
7,844,529 B2* 11/2010 Ziade .................... G06Q 40/00
283/57
(Continued)

FOREIGN PATENT DOCUMENTS

| WO | 2016070096 | 5/2016 |
| WO | 2016160539 | 10/2016 |
| WO | 2018084867 | 5/2018 |

OTHER PUBLICATIONS

Cannon, "Package 'monmlp' Monotone Multi-Layer Perceptron Neural Network", Jul. 23, 2015, 14 pages.
(Continued)

*Primary Examiner* — Kamran Afshar
*Assistant Examiner* — Imad Kassim
(74) *Attorney, Agent, or Firm* — Kilpatrick Townsend & Stockton LLP

(57) ABSTRACT

Certain aspects involve optimizing neural networks or other models for assessing risks and generating explanatory data regarding predictor variables used in the model. In one example, a system identifies predictor variables compliant with certain monotonicity constraints. The system generates a neural network for determining a relationship between each predictor variable and a risk indicator. The system performs a factor analysis on the predictor variables to determine common factors. The system iteratively adjusts the neural network so that (i) a monotonic relationship exists between each common factor and the risk indicator and (ii) a respective variance inflation factor for each common factor is sufficiently low. Each variance inflation factor indicates multicollinearity among a subset of the predictor variables corresponding to a common factor. The adjusted neural network can be used to generate explanatory indicating (Continued)

relationships between (i) changes in the risk indicator and (ii) changes in at least some common factors.

20 Claims, 5 Drawing Sheets

(51) Int. Cl.
*G06Q 40/02* (2012.01)
*G06N 3/08* (2006.01)
*G06N 20/00* (2019.01)

(56) References Cited

U.S. PATENT DOCUMENTS

| | | | | |
|---|---|---|---|---|
| 7,881,994 | B1* | 2/2011 | An | G06Q 40/00 |
| | | | | 705/35 |
| 8,086,523 | B1* | 12/2011 | Palmer | G06Q 40/025 |
| | | | | 705/38 |
| 2004/0215551 | A1* | 10/2004 | Eder | G06Q 40/00 |
| | | | | 705/38 |
| 2005/0125259 | A1* | 6/2005 | Annappindi | G06Q 40/025 |
| | | | | 705/4 |
| 2008/0301075 | A1 | 12/2008 | Bolt et al. | |
| 2011/0078073 | A1* | 3/2011 | Annappindi | G06Q 40/02 |
| | | | | 705/38 |
| 2012/0023006 | A1* | 1/2012 | Roser | G06Q 40/025 |
| | | | | 705/38 |
| 2013/0332338 | A1 | 12/2013 | Yan et al. | |
| 2014/0324677 | A1 | 10/2014 | Walraven et al. | |
| 2014/0337086 | A1 | 11/2014 | Asenjo et al. | |
| 2016/0155069 | A1 | 6/2016 | Hoover et al. | |
| 2016/0283686 | A1* | 9/2016 | Hu | G06N 5/04 |
| 2019/0108603 | A1* | 4/2019 | Waslander | G06Q 50/163 |
| 2019/0197444 | A1* | 6/2019 | Smith | G06Q 10/0635 |
| 2019/0205791 | A1* | 7/2019 | Litherland | G06N 7/005 |

OTHER PUBLICATIONS

Daniels et al., "Monotone and Partially Monotone Neural Networks", IEEE Transactions on Neural Networks, vol. 21, No. 6, Jun. 1, 2010, pp. 906-917.

Lang , "Artificial Neural Networks: Formal Models and Their Applications", ICANN, 15th International Conference, Warsaw, Poland, Proceedings, Part II, chapter Monotonic Multi-layer Perceptron Networks as Universal Approximators, Springer Berlin Heidelberg, Berlin, Heidelberg, Sep. 11-15, 2005, pp. 31-37.

Mahul et al., "Training Feed-Forward Neural Networks with Monotonicity Requirements", Technical Report, Research Report RR-04-11, LIMOS/CNRS 6158, Jun. 2004, 14 pages.

PCT/US2016/060805 , "International Search Report and Written Opinion", dated Jul. 18, 2017, 14 pages.

Sill , "Monotonic Networks", In Proceedings of the Conference on Advances in Neural Information Processing Systems 10, NIPS '97, Cambridge, MA, USA. MIT Press, 1997, pp. 661-667.

Velikova et al., "Solving Partially Monotone Problems with Neural Networks", World Academy of Science, Engineering and Technology, International Journal of Computer, Electrical, Automation, Control and Information Engineering, vol. 1, No. 12, 2007, pp. 4030-4035.

Zhang , "Feedforward Networks with Monotone Constraints", IJCNN '99. International Joint Conference on Neural Networks, vol. 3, 1999, 1820 page.

* cited by examiner

OPTIMIZING AUTOMATED MODELING ALGORITHMS FOR RISK ASSESSMENT AND GENERATION OF EXPLANATORY DATA

TECHNICAL FIELD

The present disclosure relates generally to artificial intelligence. More specifically, but not by way of limitation, this disclosure relates to machine learning using artificial neural networks or other models for emulating intelligence, where automated modeling algorithms are optimized for assessing risks and generating explanatory data regarding the impact of factors that drive or otherwise affect predictor variables used in the modeling algorithm.

BACKGROUND

Automated modeling systems implement automated modeling algorithms (e.g., algorithms using modeling techniques such as logistic regression, neural networks, support vector machines, etc.) that are trained using large volumes of training data. This training data, which can be generated by or otherwise indicate certain electronic transactions or circumstances, is analyzed by one or more computing devices of an automated modeling system. The training data is grouped into predictor variables that are provided as inputs to the automated modeling system. The automated modeling system can use this analysis to learn from and make predictions using data describing similar circumstances. For example, the automated modeling system uses the predictor variables to learn how to generate predictive outputs involving transactions or other circumstances similar to the predictor variables from the training data.

One example of a model used by an automated modeling algorithm is a neural network model. A neural network includes one or more algorithms and interconnected nodes that share input data and exchange signals (e.g., communications of data inputs or interim processed data) between one another. The nodes can have numeric weights that can be tuned based on experience, which makes the neural network adaptive and capable of learning. For example, the numeric weights in the neural network can be trained so that the neural network can perform one or more functions on a set of inputs and produce an output that is associated with the set of inputs.

SUMMARY

Various embodiments of the present disclosure provide systems and methods for optimizing neural networks or other models used in automated modeling algorithms. The optimized model is usable for assessing risks and generating explanatory data regarding how predictor variables used in the model affect certain modeled outputs (e.g., risk indicators).

In one example, a model development system can identify predictor variables in which a monotonic relationship exists between each predictor variable and an outcome. Each predictor variable can correspond to an action performed by an entity. The model development system can generate a neural network that includes one or more hidden layers for determining a relationship between each predictor variable and a risk indicator. The risk indicator can indicate a level of risk associated with the entity. The model development system can determine common factors by performing a factor analysis on the predictor variables. Each common factor can be a single variable indicating a respective relationship among a respective subset of the predictor variables. The model development system can iteratively adjust the neural network so that (i) a monotonic relationship exists between each common factor and the risk indicator as determined by the neural network and (ii) a respective variance inflation factor for each common factor is below a threshold. Each variance inflation factor indicates multicollinearity among the respective subset of the predictor variables corresponding to the common factor. Explanatory data can be generated based on the adjusted neural network. This explanatory data can indicate relationships between (i) changes in the risk indicator and (ii) changes in at least some common factors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

Features, aspects, and advantages of the present disclosure are better understood when the following Detailed Description is read with reference to the drawings.

DETAILED DESCRIPTION

Figure 1:
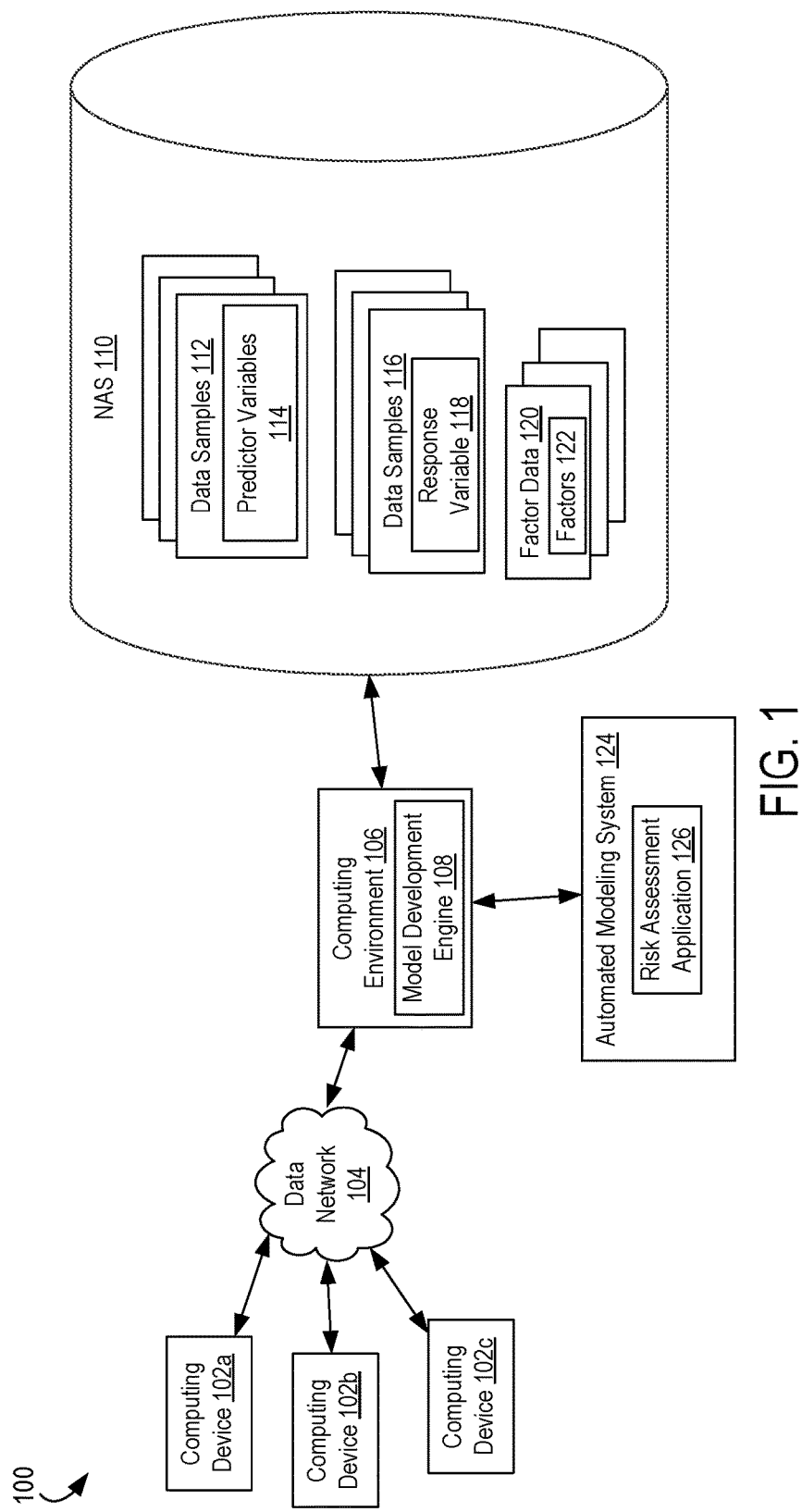
FIG. 1 is a block diagram depicting an example of an operating environment in which a model development engine optimizes neural networks and other models used in automated modeling algorithms, according to certain aspects of the present disclosure.

Certain aspects and features of the present disclosure are directed to optimizing a model (e.g., a neural network) used in automated modeling algorithm for assessing risk or modeling other outputs. An automated modeling algorithm can use the neural network or other models to perform a variety of functions including, for example, analyzing various predictor variables and outputting a risk indicator associated with the predictor variables. The neural network can be represented as one or more hidden layers of interconnected nodes that can share input data and exchange signals (e.g., communications of data inputs or interim processed data) between one another. The layers may be considered hidden because they may not be directly observable in the normal functioning of the neural network. The connections between the nodes can have numeric weights that can be tuned based on experience. Such tuning can make neural networks adaptive and capable of "learning." Tuning the numeric weights can involve adjusting or modifying the numeric weights to increase the accuracy of a risk indicator provided by the neural network. In some aspects, the numeric weights can be tuned through a process referred to as training.

In some aspects, a model development engine can generate or optimize a neural network or other model for use in the automated modeling algorithm. For example, the model development engine can receive various predictor variables. The model development engine can generate a neural network using the predictor variables, where the neural network is used for determining a risk indicator or other modeled output. The model development engine can perform a factor analysis on the predictor variables. The factor analysis can be a dimension-reduction process that identifies unobserved relationships among multiple predictor variables that are interrelated. The factor analysis is used to determine various factors that represent these relationships. Although the factors are not part of the neural network model itself, the factors can be used to explain one or more characteristics of the model (e.g., by generating data describing the impact of factors driving one or more predictor variables on a modeled output, providing adverse action codes, or providing reason codes, etc.).

The model development engine can optimize the neural network so that the factors satisfy certain constraints. These constraints can include a monotonicity constraint, in which the modeled output is monotonic with respect to each factor. Examples of a monotonic relationship between a predictor variable and a predictive output include a relationship in which a value of the predictive output increases as the value of the predictor variable increases or a relationship in which the value of the predictive output decreases as the value of the predictor variable increases. These constraints also can include a multicollinearity constraint, in which each relevant factor (e.g., common factors, certain specific factors, etc.) exhibits sufficiently low multicollinearity with respect to other relevant factors. Multicollinearity can include cases in which changed values of one predictor variable result in changed values of other, interrelated predictor variables.

Optimizing a neural network can include iteratively adjusting one or more characteristics of the neural network or the factor analysis so that the relevant factors satisfy the monotonicity and multicollinearity constraints. For example, a model development engine can modify the number of variables available to the neural network, the number of nodes in the neural network, the number of layers in the neural network, the number of factors used in the factor analysis, or some combination thereof. Optimizing the neural network in this manner can allow the neural network to be used for both accurately determining risk indicators (or other modeled outputs) using predictor variables and generating explanatory data for the predictor variables. The explanatory data (e.g., reason codes) can indicate how certain factors, which drive or otherwise affect associated predictor variables, impacted the risk indicator or other modeled output that is generated using the model.

For example, an optimized neural network can be used for both determining a credit score associated with an entity (e.g., an individual or business) based on predictor variables associated with the entity. A predictor variable can be any variable predictive of risk that is associated with an entity. Any suitable predictor variable that is authorized for use by an appropriate legal or regulatory framework may be used. Examples of predictor variables include, but are not limited to, variables indicative of prior actions or transactions involving the entity (e.g., information that can be obtained from credit files or records, financial records, consumer records, or other data about the activities or characteristics of the entity), variables indicative of one or more behavioral traits of an entity (e.g., being past due on an obligation), etc. The neural network can be used to determine how the value of the risk indicator is impacted by each relevant factor (and its associated predictor variables). Explanatory data generated using the optimized network, such as an adverse action code, can indicate an effect or an amount of impact that a given factor, or a predictor variable associated with the factor, has on the value of a modeled output (e.g., the relative negative impact of the factor or associated predictor variable on a credit score or other risk indicator).

In some aspects, the optimization techniques described herein can provide performance improvements in systems that use automated modeling algorithms to generate risk indicators or other modeled outputs. For example, the accuracy with which an automated modeling algorithm learns to make predictions of future actions can depend on the predictor variables used to train the automated modeling algorithm. Larger numbers of predictor variables allow the automated modeling algorithm to identify different scenarios that may affect a predictive output, to increase the confidence that a trend associated with the predictor variables has been properly identified, or both. Thus, if an automated modeling algorithm uses a larger number of predictor variables having some relationship with a modeled output (e.g., a predictive or analytical output), the accuracy of the modeled output may increase.

But certain constraints on modeling systems may reduce the number of predictor variables used by a given automated modeling algorithm. For example, modeling systems may be constrained in the types of predictor variables used by an automated modeling algorithm. These constraints on the predictor variables may cause certain predictor variables to be excluded from consideration when selecting predictor variables for training the modeling algorithm. Excluding these predictor variables may decrease the accuracy or effectiveness of the trained automated modeling algorithm. One example of such a constraint is a monotonicity constraint, in which the training data for a given predictor variable must exhibit a monotonic relationship with the modeled output. Another example of a constraint on a model is a multicollinearity constraint. The impact of one predictor variable on a modeled output may be difficult to explain if the predictor variable exhibits multicollinearity with respect to other predictor variables.

Certain optimization operations described herein can address these problems by providing a framework for an automated modeling algorithm that produces a model that is both accurate and that can be explained (e.g., by returning an accurate reason code with respect to a given predictor variable or subgroup of predictor variables). For example, performing a factor analysis on the predictor variables used in a neural network can identify common factors and specific factors that are associated with the predictor variables. The common factors (and, in some aspects, specific factors) can satisfy monotonicity constraints and multicollinearity constraints, even if the underlying predictor variables fail to satisfy one or more of these constraints. Thus, the factors, which satisfy monotonicity constraints and multicollinearity constraints, can be used to explain the model (e.g., the impact of certain factors or associated predictor variables on a modeled output) without eliminating predictor variables that enhance the predictive or analytical accuracy of the model.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example

Referring now to the drawings, FIG. 1 is a block diagram depicting an example of an operating environment 100 in which a model development engine 108 optimizes neural networks (or other models) used in automated modeling algorithms. FIG. 1 depicts examples of hardware components of a operating environment 100, according to some aspects. The operating environment 100 is a specialized computing system that may be used for processing large amounts of data using a large number of computer processing cycles. The numbers of devices depicted in FIG. 1 are provided for illustrative purposes. Different numbers of devices may be used. For example, while each device, server, and system in FIG. 1 is shown as a single device, multiple devices may instead be used.

The operating environment 100 may include a computing environment 106. The computing environment 106 may be a specialized computer or other machine that processes the data received within the operating environment 100. The computing environment 106 may include one or more other systems. For example, the computing environment 106 may include a database system for accessing the network-attached data stores 110, a communications grid, or both. A communications grid may be a grid-based computing system for processing large amounts of data.

The operating environment 100 may also include one or more network-attached data stores 110. The network-attached data stores 110 can include memory devices for storing data samples 112, 116 and factor data 120 to be processed by the computing environment 106. (In some aspects, the network-attached data stores 110 can also store any intermediate or final data generated by one or more components of the operating environment 100.) The data samples 112, 116 can be provided by one or more computing devices 102a-c, generated by computing devices 102a-c, or otherwise received by the operating environment 100 via a data network 104. The factor data 120 can be generated by the model development engine 108 using the data samples 112, 114.

The data samples 112 can have values for various predictor variables 114. The data samples 116 can have values for one or more response variables 118. For example, a large number of observations can be generated by electronic transactions, where a given observation includes one or more attributes (or data from which an attribute can be computed or otherwise derived). An attribute can be used as a predictor variable 114 in an automated modeling algorithm. A given observation can also include data for one or more response variables (or data from which a response variable value can be computed or otherwise derived). Examples of predictor variables can include data associated with an entity, where the data describes prior actions or transactions involving the entity (e.g., information that can be obtained from credit files or records, financial records, consumer records, or other data about the activities or characteristics of the entity), behavioral traits of the entity, or any other traits of that may be used to predict risks associated with the entity. In some aspects, predictor variables can be obtained from credit files, financial records, consumer records, etc. An automated modeling algorithm can use the data samples 112, 116 to learn relationships between the predictor variables 114 and one or more response variables 118.

Network-attached data stores 110 may also store a variety of different types of data organized in a variety of different ways and from a variety of different sources. For example, network-attached data stores 110 may include storage other than primary storage located within computing environment 106 that is directly accessible by processors located therein. Network-attached data stores 110 may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The operating environment 100 can also include one or more computing devices 102a-c. The computing devices 102a-c may include client devices that can communicate with the computing environment 106. For example, the computing devices 102a-c may send data to the computing environment 106 to be processed, may send signals to the computing environment 106 to control different aspects of the computing environment or the data it is processing. The computing devices 102a-c may interact with the computing environment 106 via one or more networks 104.

The computing devices 102a-c may include network computers, sensors, databases, or other devices that may transmit or otherwise provide data to computing environment 106. For example, the computing devices 102a-c may include local area network devices, such as routers, hubs, switches, or other computer networking devices.

Each communication within the operating environment 100 (e.g., between client devices, between automated modeling systems 124 and computing environment 106, or between a server and a device) may occur over one or more networks 104. Networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the network 104. The networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The computing environment 106 can include one or more processing devices that execute program code stored on a non-transitory computer-readable medium. The program code can include a model development engine 108.

The model development engine 108 can generate factor data 120 for one or more factors 122. A factor 122 can represent unobserved relationships among a subset of the predictor variables 114. For instance, a factor 122 may capture or otherwise represent potential interactions between at least some of the predictor variables 114 used to determine the factor 122.

The model development engine 108 can determine the factors 122 by performing a factor analysis that is used for optimizing a neural network or other automated modeling algorithm, as described in further detail herein. The model development engine 108 can receive, via a network 104 or other suitable communication channel, various inputs that control or influence how to generate factors 122. Based on these inputs, the model development engine 108 can generate the factors 122. The inputs can include predictor variables (e.g., any number of consumer-level attributes such as Equifax® Advanced Decisioning Attributes ("ADA"), Equifax® Dimensions® attributes, etc.), and a response variable. The set of factors 122 can reduce, relative to the number of predictor variables, the number of dimensions on which monotonicity and multicollinearity are evaluated. In some aspects, the factors 122 can satisfy one or more constraints (e.g., monotonicity constraints, multicollinearity constraints, etc.).

The operating environment 100 may also include one or more automated modeling systems 124. The computing environment 106 may route select communications or data to the automated modeling systems 124 or one or more servers within the automated modeling systems 124. Automated modeling systems 124 can be configured to provide information in a predetermined manner. For example, automated modeling systems 124 may access data to transmit in response to a communication. Different automated modeling systems 124 may be separately housed from each other device within the operating environment 100, such as computing environment 106, or may be part of a device or system. Automated modeling systems 124 may host a variety of different types of data processing as part of the operating environment 100. Automated modeling systems 124 may receive a variety of different data from the computing devices 102a-c, from the computing environment 106, from a cloud network, or from other sources.

Examples of automated modeling systems 124 include a mainframe computer, a grid computing system, or other computing system that executes an automated modeling algorithm (e.g., an algorithm using logistic regression, neural networks, etc.) that can learn or otherwise identify relationships between predictor variables and response variables. In some aspects, the automated modeling system 124 can execute a risk assessment application 126, which can utilize a model (e.g., a neural network, a logistic regression model, etc.) optimized or otherwise developed using the model development engine 108. In additional or alternative aspects, the automated modeling system 124 can execute one or more other applications that generate predictive or analytic outputs. These predictive or analytic outputs can be generated using a model (e.g., a neural network, a logistic regression model, etc.) that has been optimized or otherwise developed using the model development engine 108.

Model Optimization Examples

Optimizing a model for use by the automated modeling system 124 can involve developing a neural network model, a logistic regression model, or other suitable model that can provide accurate predictive or analytical outputs (e.g., a risk indicator) and that can also provide an explanatory capability. Certain risk assessment applications (or other analytical or predictive applications) require using models having an explanatory capability. For example, in an automated modeling algorithm using a neural network model, a logistic regression model, or other suitable model, an explanatory capability can involve generating explanatory data such as adverse action codes (or other reason codes) associated with predictor variables that are included in the model. This explanatory data can indicate an effect or an amount of impact that a given predictor variable or a factor driving given predictor variables has on a risk indicator (or other predictive or analytical output) generated using an automated modeling algorithm.

In some aspects, models used by an automated modeling system 124 must have an explanatory capability. For instance, certain industries involving technologies that apply modeling practices for practical ends (e.g., risk science, credit scoring, etc.) can be subject to regulations, business policies, or other criteria used to generate risk evaluations or other predictive modeling outputs. Examples of regulations and other legal requirements to which the optimization process conforms include (but are not limited to) the Equal Credit Opportunity Act ("ECOA") (which is implemented by Regulation B) and the Fair Housing Act, as well as reporting requirements associated with ECOA, the Fair Credit Reporting Act ("FCRA"), the Dodd-Frank Act, and the Office of the Comptroller of the Currency ("OCC"). Predictor variables that interact with one another may reduce the explanatory capability of certain models, even if the inclusion of these predictor variables in a model will enhance its predictive or analytical accuracy. Thus, to comply with these regulations and legal requirements, existing automated modeling systems use models that may have a reduced accuracy (e.g., predictive capability), since these models may rely on excluding predictor variables that interact with one another and therefore exhibit multicollinearity.

Certain aspects involving the model development engine 108 can increase the accuracy of predictive or analytical models while maintaining an explanatory capability for these models. For instance, the model development engine 108 can optimize a neural network or other model by allowing more predictive variables to be included in a statistically sound and regulatory compliant manner, while returning correct explanatory data (e.g., adverse action codes) for consumers or other entities associated with the data samples 112, 116. The additional predictive variables can provide measurable lift in, for example, predictive power over existing industry-standard models. Thus, the model development engine 108 can enhance the predictive power of statistically sound risk models and other models while ensuring that the models can fully explain the modeled behavior, thereby allowing for the generation of correct reason codes or other explanatory data.

Figure 2:
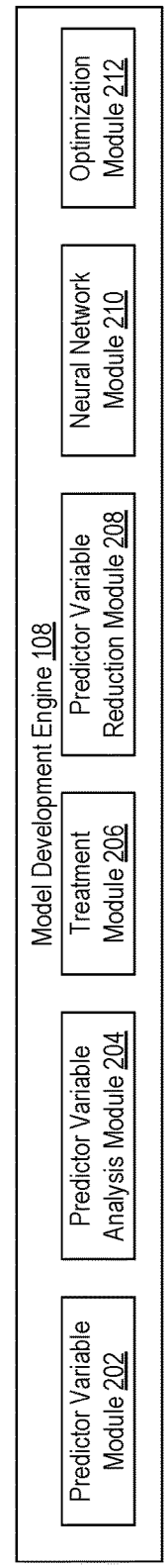
FIG. 2 is a block diagram depicting an example of the model development engine of FIG. 1, according to certain aspects of the present disclosure.

The model development engine 108 can include one or more modules for generating and optimizing a neural network. For example, FIG. 2 is a block diagram depicting an example of the model development engine 108 of FIG. 1. The model development engine 108 depicted in FIG. 2 can include various modules 202, 204, 206, 208, 210, 212 for generating and optimizing a neural network or other model, which can be used for assessing risk or generating other outputs providing analytical or predictive information. Each of the modules 202, 204, 206, 208, 210, 212 can include one or more instructions stored on a computer-readable medium and executable by processors of one or more computing devices (e.g., the automated modeling system 124). Executing the instructions causes the model development engine 108 to generate a model (e.g., a neural network) and optimize the model for generating analytical or predictive outputs (e.g. risk indicators) and for providing explanatory data regarding the generation of the analytical or predictive outputs (e.g., the impacts of certain factors driving predictor variables on the generation of the risk indicator).

The model development engine 108 can use the predictor variable module 202 for obtaining or receiving data samples 112 having values of multiple predictor variables 114. In some aspects, the predictor variable module 202 can include instructions for causing the model development engine 108 to obtain or receive the data samples 112 from a suitable data structure, such a database stored in the network-attached data stores 110 of FIG. 1. The predictor variable module 202 can use any predictor variables or other data suitable for assessing one or more risks associated with an entity. Examples of predictor variables can include data associated with an entity that describes prior actions or transactions involving the entity (e.g., information that can be obtained from credit files or records, financial records, consumer records, or other data about the activities or characteristics of the entity), behavioral traits of the entity, or any other traits that may be used to predict risks associated with the entity. In some aspects, predictor variables 114 can be obtained from credit files, financial records, consumer records, etc.

In some aspects, the model development engine 108 can include a predictor variable analysis module 204 for analyzing various predictor variables. The predictor variable analysis module 204 can include instructions for causing the model development engine 108 to perform various operations on the predictor variables for analyzing the predictor variables.

For example, the predictor variable analysis module 204 can perform an exploratory data analysis, in which the predictor variable analysis module 204 analyzes a distribution of one or more predictor variables and determines a bivariate relationship or correlation between the predictor variable and an odds index or a good/bad odds ratio. The odds index can indicate a ratio of positive to negative outcomes. A positive outcome can indicate that a condition has been satisfied. A negative outcome can indicate that the condition has not been satisfied. As an example, the predictor variable analysis module 204 can perform the exploratory data analysis to identify trends associated with predictor variables and a good/bad odds ratio (e.g., the odds index).

In this example, a measure on the bivariate relationship between the predictor variable and the odds index, such as a correlation between the two, indicates a measure of the strength of the relationship between the predictor variable and the odds index. In some aspects, the measure on the bivariate relationship between the predictor variable and the odds index is usable to determine (e.g., quantify) a predictive strength of the predictor variable with respect to the odds index. The predictor variable's predictive strength indicates an extent to which the predictor variable is usable to accurately predict a positive or negative outcome or a likelihood of a positive or negative outcome occurring based on the predictor variable.

For instance, the predictor variable can be a number of times that an entity (e.g., a consumer) fails to pay an invoice within 90 days. A large value for this predictor variable (e.g., multiple delinquencies) may indicate a higher likelihood of a negative outcome (e.g., default on the invoice), which is associated with a lower odds index (e.g., result in a higher number of adverse outcomes, such as default, across one or more consumers). As another example, a small value for the predictor variable (e.g., fewer delinquencies) may indicate a higher likelihood of a positive outcome (e.g., paying the invoice on time), which is associated with a higher odds index (e.g., result in a lower number of adverse outcomes, such as default, across one or more consumers). The predictor variable analysis module 204 can determine and quantify an extent to which the number of times that an entity fails to pay an invoice within 90 days can be used to accurately predict a default on an invoice or a likelihood that the entity will default on the invoice in the future.

In some aspects, the predictor variable analysis module 204 can develop an accurate model of a relationship between one or more predictor variables and one or more positive or negative outcomes. The model can indicate a corresponding relationship between the predictor variables and an odds index or a corresponding relationship between the predictor variables and a risk indicator (e.g., a credit score associated with an entity). As an example, the model development engine 108 can develop a model that accurately indicates that a consumer having more financial delinquencies is a higher risk than a consumer having fewer financial delinquencies.

The model development engine 108 can also include a treatment module 206 for causing a relationship between a predictor variable and an odds index to be monotonic. One example of a monotonic relationship between the predictor variable and the odds index is a relationship in which a value of the odds index increases as a value of the predictor variable increases. Another example of a monotonic relationship between the predictor variable and the odds index is a relationship in which the value of the odds index decreases as the value the predictor variable increases. In some aspects, the treatment module 206 can execute one or more algorithms that apply a variable treatment, which can cause the relationship between the predictor variable and the odds index to be monotonic. Examples of functions used for applying a variable treatment include (but are not limited to) binning, capping or flooring, imputation, substitution, recoding variable values, etc.

The model development engine 108 can also include a predictor variable reduction module 208 for identifying or determining a set of predictor variables that have a monotonic relationship with one or more odds indices. For example, the treatment module 206 may not cause a relationship between every predictor variable and the odds index to be monotonic. In such examples, the predictor variable reduction module 208 can select a set of predictor variables with monotonic relationships to one or more odds indices. The predictor variable reduction module 208 can execute one or more algorithms that apply one or more preliminary variable reduction techniques for identifying the set of predictor variables having the monotonic relationship with one or more odds indices. Preliminary variable reduction techniques can include rejecting or removing predictor variables that do not have a monotonic relationship with one or more odds indices.

In some aspects, the model development engine 108 can include a neural network module 210 for generating a neural network. The neural network module 210 can include instructions for causing the model development engine 108 to execute one or more algorithms to generate the neural network Neural networks can be represented as one or more layers of interconnected nodes that can share input data and exchange signals between one another. The connections between the nodes can have numeric weights that can be tuned based on experience. Such tuning can make neural networks adaptive and capable of learning. Tuning the numeric weights can increase the accuracy of output provided by the neural network. In some aspects, the model development engine 108 can tune the numeric weights in the neural network through a training process.

In some aspects, the neural network module 210 includes instructions for causing the model development engine 108 to generate a neural network using a set of predictor variables having a monotonic relationship with an associated odds index. For example, the model development engine 108 can generate the neural network such that the neural network models the monotonic relationship between one or more odds indices and the set of predictor variables identified by the predictor variable reduction module 208.

The model development engine 108 can generate any type of neural network (or other model) that can be used for assessing risk or generating some other modeled output (e.g., an analytical output or a predictive output). In some aspects, the model development engine can generate a neural network based on one or more criteria or rules obtained from industry standards. In other aspects, the model development engine can generate a neural network without regard to criteria or rules obtained from industry standards.

In one example, the model development engine can generate a feed-forward neural network. A feed-forward neural network can include a neural network in which every node of the neural network propagates an output value to a subsequent layer of the neural network. For example, data may move in one direction (forward) from one node to the next node in a feed-forward neural network. The feed-forward neural network can include one or more hidden layers of interconnected nodes that can share input data and exchange signals between one another. The layers may be considered hidden because they may not be directly observable in the normal functioning of the neural network. For example, input nodes corresponding to predictor variables can be observed by accessing the data used as the predictor variables, and nodes corresponding to risk assessments can be observed as outputs of an algorithm using the neural network. But the nodes between the predictor variable inputs and the risk assessment outputs may not be readily observable, though the hidden layer is a standard feature of neural networks.

In some aspects, the model development engine 108 can generate the neural network and use the neural network for both determining a risk indicator (e.g., a credit score) based on predictor variables. The model development engine 108 can optimize the neural network such that the output of the model can be explained. For instance, the model development engine 108 can include an optimization module 212 for optimizing the neural network (or other model) generated using the model development engine. Optimizing the neural network (or other model) can allow both the risk indicator and the impact of a factor associated with a predictor variable to be identified using the same neural network. Examples of optimizing the neural network or other model are described herein with respect to FIG. 3.

In some aspects, the outputs from an optimization process can be used to adjust the neural network or other model. For example, if an exploratory data analysis indicates that a positive relationship exists between an odds ratio (e.g., an odds index) and a predictor variable, and a neural network shows a negative relationship between a credit score and a factor positively associated with the predictor variable, the neural network can be modified. For example, the architecture of the neural network can be changed (e.g., by adding or removing a node from a hidden layer or increasing or decreasing the number of hidden layers), a factor analysis can be modified (e.g., by modifying the number of factors used), one or more of the predictor variables can be modified through transformations, or one or more of the predictor variables can be eliminated from the neural network.

In some aspects, removing predictor variables from a neural network can remove sources of multicollinearity. In these aspects, removing predictor variables that have multicollinearity with one another can cause the neural network to converge to a version having predictor variables that are monotonic with respect to the risk indicator and that lack multicollinearity with respect to one another.

The optimization module 212 can include instructions for causing the model development engine 108 to determine a relationship between a risk indicator (e.g., a credit score) and one or more factors, which are determined by performing a factor analysis on the predictor variables used to determine the risk indicator. As an example, the optimization module 212 can determine whether a relationship between each of the relevant factors and the risk indicator is monotonic. A monotonic relationship exists between each relevant factor and the risk indicator either when a value of the risk indicator increases as a value of the factor increases or when the value of the risk indicator decreases as the value of the factor increases.

The optimization module 212 can also determine whether a degree of multicollinearity among the relevant factors is sufficiently low. For instance, degree of multicollinearity among the relevant factors is sufficiently low if the relevant factors are orthogonal or near-orthogonal. Orthogonality can include a change in one factor impacting the risk indicator without impacting the value of another factor. (By contrast, an absence of orthogonality among factors may negatively impact the explanatory capability of the model.)

In some aspects, the relevant factors used in the determinations of monotonicity and multicollinearity are limited to the common factors determined from a factor analysis. In other aspects, the relevant factors used in the determination above are the common factors determined from a factor analysis and at least some specific factors determined from the factor analysis.

In some aspects, the optimization module 212 includes instructions for causing the model development engine to determine that certain predictor variables are valid for the neural network. The predictor variables can be considered valid if the predictor variables are associated with factors that have a monotonic relationship with respect to the risk indicator and that exhibit sufficiently low multicollinearity. If the determined factors result in a non-monotonic relationship with the risk indicator or an unacceptable degree of multicollinearity, the optimization module 212 can cause the model development engine 108 to optimize the neural network. Optimizing the neural network can include, for example, iteratively adjusting one or more of the predictor variables, the number of nodes in the neural network, the number of hidden layers in the neural network, or the factor analysis until monotonicity and multicollinearity constraints are satisfied.

In some aspects, the optimization module 212 includes instructions for causing the model development engine 108 to perform a test process for determining an effect or an impact of each predictor variable or factor driving a certain predictor variables on the risk indicator after the iteration is terminated. For example, the model development engine 108 can use a neural network or other optimized model to implicitly incorporate non-linearity into one or more modeled relationships between each predictor variable and the risk indicator. The optimization module 212 can include instructions for causing the model development engine 108 to determine a rate of change (e.g., a derivative or partial derivative) of the risk indicator with respect to each relevant factor. The rate of change is determined through every path in the neural network that each relevant factor can follow to affect the risk indicator. Each path includes one or more predictor variables associated with the factor.

In some aspects, the model development engine 108 determines a sum of derivatives for each connection of a relevant factor with the risk indicator. In some aspects, the model development engine can analyze, for each relevant factor, the partial derivative of the risk indicator across a range of interactions within a neural network model and a set of sample data for the predictor variable. An example of sample data is a set of values of the predictor variables that are obtained from credit records or other consumer records and a set of factor data that is generated from the data for the predictor variables. The model development engine 108 can determine that the combined non-linear influence of each factor is aligned with business rule requirements used in a relevant industry (e.g., the credit reporting industry). For example, the model development engine can identify adverse action codes from the relevant factors, and the consumer can modify his or her behavior relative to the adverse action codes such that the consumer can improve his or her credit score.

Optimizing the neural network or other model in this manner can allow the model development engine 108, as well as a risk assessment application 126 or other automated modeling algorithm, to use the model to accurately determine risk indicators using predictor variables and to accurately determine associated explanatory data (e.g., adverse action codes) for the model. The model development engine 108 can output one or more of the risk indicators and the explanatory data associated with one or more of the predictor variables. In some applications used to generate credit decisions, the model development engine 108 can use an optimized neural network or other model to provide recommendations to a consumer based on adverse action codes or other explanatory data. The recommendations may indicate one or more actions that the consumer can take to improve the risk indicator (e.g., improve a credit score).

Figure 3:
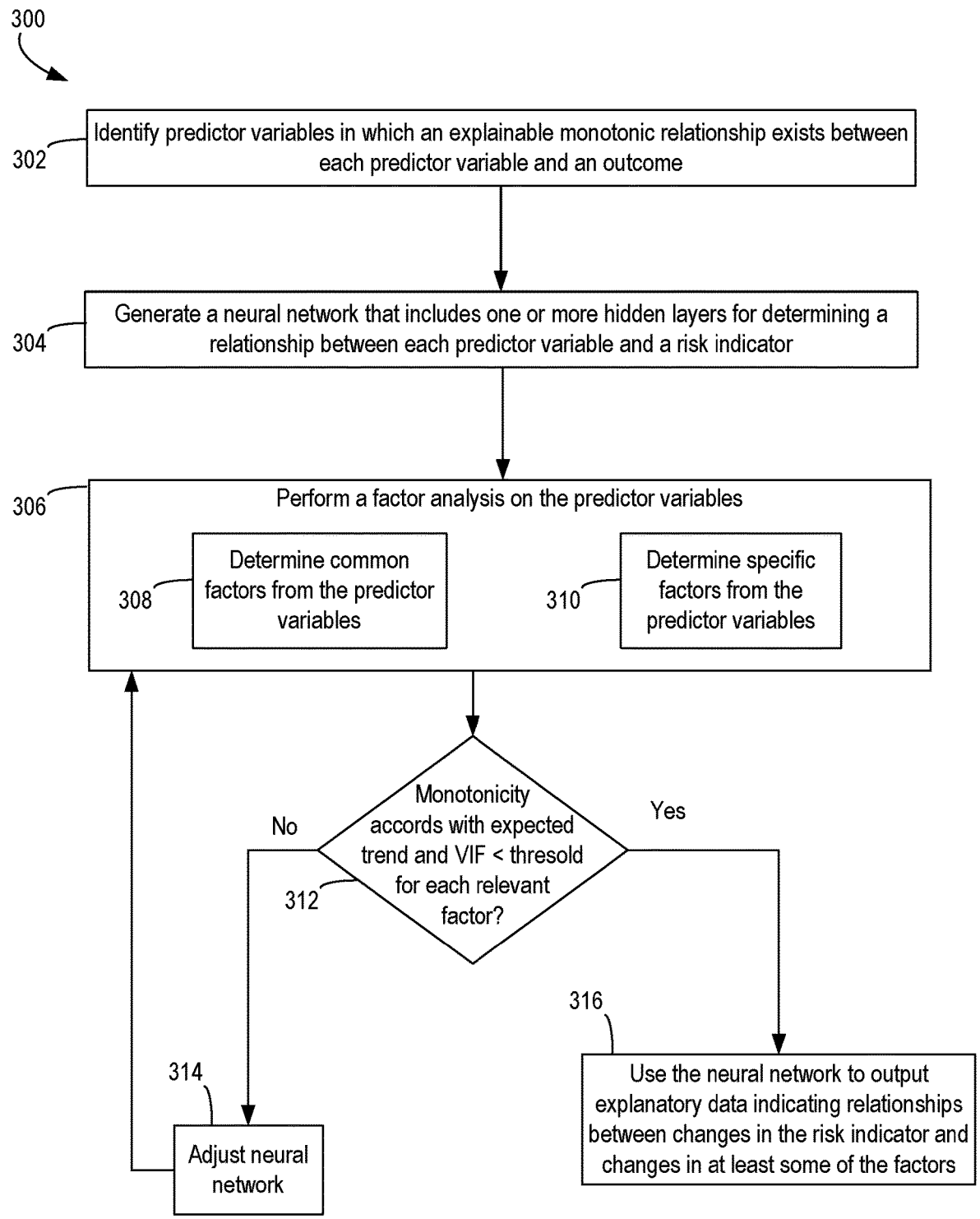
FIG. 3 is a flow chart depicting an example of a process for optimizing a neural network for risk assessment, according to certain aspects of the present disclosure.

FIG. 3 is a flow chart depicting an example of a process 300 for optimizing a neural network model (or other suitable model for an automated modeling algorithm) using a factor analysis of predictor variables in the model. For illustrative purposes, the process 300 is described with reference to the implementation depicted in FIGS. 1-3 and various other examples described herein. But other implementations are possible.

The process 300 can involve identifying predictor variables in which an explainable monotonic relationship exists between each predictor variable and an outcome, as depicted in block 302. A given monotonic relationship is explainable if, for example, the monotonic relationship has been derived or otherwise identified using one or more operations described herein with respect to FIG. 4. For example, an explainable relationship can involve a trend that is monotonic, satisfies relevant business rules (e.g. treats each entity fairly), and does not violate any regulatory constraint. Examples of violations of regulatory constraints include a good-to-bad odds ratio that decreases as a consumer's age increases, which may be barred by regulatory constraints on penalizing consumers based on their ages, and a good-to-bad odds ratio that increases as a consumer's past due amount increases, which would "reward" an undesirable behavior (e.g., being past due on an obligation).

In some aspects, each predictor variable can correspond to actions performed by one or more entities. One or more of the predictor variable module 202, the predictor variable analysis module 204, the treatment module 206, and the predictor variable reduction module 208 can be executed by one or more suitable processing devices to implement block 302. Executing one or more of these modules can provide a set of predictor variables having monotonic relationships with respect to an outcome (e.g., an odds ratio). The model development engine 108 can identify and access the set of predictor variables for use in generating an optimized neural network.

The process 300 can also involve generating a neural network that includes one or more hidden layers for determining a relationship between each predictor variable and a risk indicator, as depicted in block 304. For example, the neural network module 210 can be executed by one or more suitable processing devices. Executing the neural network module 210 can generate a neural network having one or more hidden layers.

The process 300 can also involve performing a factor analysis on the predictor variables, as depicted in block 306. For example, the optimization module 212 can be executed by one or more suitable processing devices. Executing the optimization module 212 can cause the computing environment 106 to perform the factor analysis. In some aspects, the factor analysis involves determining common factors from the predictor variables, as depicted at block 308. Each common factor can be a single variable indicating a relationship among a subset of the predictor variables 114. For instance, in a neural network including predictor variables $X_1$ through $X_n$. A factor analysis of the predictor variables $X_1$ through $X_n$ can identify common factors $F_1$ through $F_q$. In this example, two related predictor variables $X_1$ and $X_2$ from the set of predictor variables 114 may share the common factor $F_1$, and two other related predictor variables $X_3$ and $X_4$ from the set of predictor variables 114 may share the common factor $F_2$.

In additional aspects, the factor analysis involves determining specific factors from the predictor variables, as depicted at block 310. A specific factor contains unique information associated with a predictor variable, where the unique information is specific to that predictor variable and is not captured by common factors corresponding to the predictor variable. Continuing with the example above, a factor analysis of the predictor variables $X_1$ through $X_n$ can identify specific factors $\varepsilon_1$ through $\varepsilon_n$. A specific factor $\varepsilon_1$ is associated with the predictor variable $X_1$, a specific factor $\varepsilon_2$ is associated with the predictor variable $X_2$, and so on.

In some aspects, block 306 can be implemented by performing the factor analysis using the following function:

$$\frac{X_i - \mu_i}{\sigma_i} = \sum_{j=1}^{q} \ell_{ij} F_j + \varepsilon_i.$$

This function identifies a given dataset (e.g., a subset of the data samples 112) for a predictor variable $X_i$, where the dataset has a mean of $\mu_i$ and a standard deviation of $\sigma_i$. The function relates the predictor variable $X_i$ to a weighted sum of q common factors F. The weight of each common factor $F_j$ is the respective coefficient $l_{ij}$ for the $i^{th}$ predictor variable and the $j^{th}$ common factor.

In some aspects, the model development engine 108 can evaluate and adjust the neural network using both the common factors and the specific factors, as described herein. In other aspects, the model development engine 108 can use the common factors and ignore information regarding the specific factors when evaluating and adjusting the neural network.

For instance, the process 300 can also involve determining whether (i) a monotonic relationship exists between each factor and the risk indicator and (ii) a respective variance inflation factor ("VIF") for each factor is below a given threshold, as depicted in block 312. For example, the optimization module 212 can be executed by one or more suitable processing devices. Executing the optimization module 212 can evaluate, with respect to the risk indicator, the monotonicity of each factor under consideration by the optimization module 212. Executing the optimization module 212 can also evaluate the VIF of each factor under consideration by the optimization module 212.

The VIF evaluated at block 312 indicates a degree of multicollinearity (or absence of multicollinearity) among the factors under consideration (e.g., the common factors, the specific factors, or both). The VIF can measure how much the variance of the estimated regression coefficients for various variables (e.g., the factors under consideration) are inflated as compared to when the variables are not interrelated.

At block 312, the optimization module 212 can compute a VIF for each common factor. In some aspects, the optimization module 212 can also compute a VIF for each specific factor. The VIFs indicate whether each common factor (and, in certain aspects, each specific factor) exhibits multicollinearity with respect to one or more other factors. In some aspects, the VIFs are computed in accordance with relevant industry standards governing the risk assessment application 126, scientific standards governing the risk assessment application 126, or both. But other implementations are possible. For example, in other aspects, the VIFs are computed without regard to certain industry standards.

In some aspects, the factors under consideration include both the common factors and the specific factors. In these aspects, the determination performed at block 312 involves evaluating monotonicity of each common factor with respect to the risk indicator and each specific factor with respect to the risk indicator. These aspects also involve evaluating the VIF associated with each common factor and the VIF associated with each specific factor. In other aspects, the factor under consideration by the optimization module 212 include one or more common factors generated at block 308, but not the specific factors generated at block 310. In these aspects, the determination performed at block 310 is limited to evaluating the monotonicity of the common factors (not the specific factors) and evaluating the VIF of the common factors (not the specific factors).

The presence of multicollinearity (or an unacceptable degree of multicollinearity) can indicate that the neural network generated at block 304 should be adjusted. For example, the neural network may be used by a risk assessment application 126, which can execute a credit modeling algorithm (or other automated modeling algorithm) that assesses risks associated with entities. Certain credit modeling algorithms (or other automated modeling algorithms) may be subject to regulatory or business constraints. These constraints may require the model (e.g., a neural network) to be usable for explaining relationships between predictor variables and risk assessments or other predictive outputs generated using the model. The presence of multicollinearity among variables in the model may violate these requirements. Thus, if the common factors (and, in certain aspects, the specific factors) associated with the neural network exhibit multicollinearity, the neural network is not usable in a manner that is compliant with the relevant constraints.

The optimization module 212 can be used to adjust the neural network such that the neural network complies with constraints involving monotonicity and multicollinearity. If non-monotonicity exists with respect to one or more factors and the risk indicator, a respective VIF for each factor exceeds a threshold, or both, the process 300 can also involve adjusting the neural network, as depicted in block 314. One or more of the neural network module 210 and the optimization module 212 can be executed by one or more suitable processing devices. Executing one or more of these modules can adjust a characteristic related to the neural network. The process 300 can return to block 306 and perform another iteration using the neural network with the adjustments.

Block 314 can involve adjusting any characteristic related to the neural network that impacts the monotonicity or VIF associated with the factors generated by a factor analysis. In some aspects, block 314 can involve adjusting a number of nodes in one or more hidden layers of the neural network. In additional or alternative aspects, block 314 can involve adjusting a number of hidden layers in the neural network. In additional or alternative aspects, block 314 can involve adjusting one or more characteristics of the factor analysis performed at block 306. For instance, the value of q in the function described above, which can indicate the number of factors used in the factor analysis, may be adjusted at block 314 or the factor rotation of the factor analysis may be adjusted at block 314. In additional or alternative aspects, block 314 can involve adjusting which predictor variables are used in the neural network. In additional or alternative aspects, block 314 can involve a adjusting predictor variable treatment or transformation used in the neural network. In additional or alternative aspects, block 314 can involve adjusting weights in the neural network. For instance, weights violating monotonicity constraints may be further constrained to zero.

If a monotonic relationship exists between each relevant factor and the risk indicator and a respective VIF for each factor is below a given threshold, the process 300 can proceed to block 316. At block 316, the process 300 can involve outputting, using the adjusted neural network, explanatory data indicating relationships between changes in the risk indicator and changes in at least some of the factors evaluated at block 312. For example, one or more of the model development engine 108 or the risk assessment application 126 can be executed by one or more suitable processing devices. Executing the model development engine 108 or the risk assessment application 126 can involve using the neural network to generate explanatory data that describes, for example, relationships between certain predictor variables and a risk indicator or other predictive output generated using the neural network.

For illustrative purposes, the process 300 is described with respect to neural networks. But other implementations are possible. For example, using a factor analysis in which the factors are subject to a monotonicity and VIF constraint may be used with any automated modeling algorithm (e.g. a risk model) that is used to determine risks (or other outputs of a predictive or analytical nature) if reason codes or other explanatory data must also be obtained using the model.

The process 300 allows the neural network used at block 316 to include collinear predictor variables that correspond to common factors (and, in some aspects, specific factors), where the factors exhibit no multicollinearity or sufficiently small multicollinearity. The lack of multicollinearity (or the sufficiently small multicollinearity) among these factors enables explanatory data to be generated using the optimized neural network. Furthermore, since the neural network does not require eliminating predictor variables exhibiting multicollinearity, the process 300 can avoid or reduce a loss of accuracy in the predictive function of the neural network, which would otherwise occur if certain predictor variables were eliminated. Thus, the explanatory capability of the neural network can be maintained without sacrificing accuracy in the predictive or analytical capability of the neural network.

An example of explanatory data is a reason code, adverse action code, or other data indicating an impact of a given predictor variable or factor on a predictive output (e.g., a risk indicator). For instance, explanatory reason codes may indicate why an entity received a particular score, which is indicative of a risk associated with the entity. The explanatory reason codes can be generated from the adjusted neural network model to satisfy any suitable requirements (e.g., explanatory requirements, business rules, regulatory requirements, etc.).

In some aspects, a reason code or other explanatory data may be generated using a "points below max" approach. Generating the reason code or other explanatory data can involve identifying a function $f$. The function $f$ can be used for risk assessment or for generating other predictive outputs or analytic outputs. The function $f$ can use, as inputs, common factors $F_1$-$F_q$ and specific factors $\varepsilon_1$-$\varepsilon_n$. The function f can output a risk indicator or other predictive or analytic output.

A "points below max" approach uses values of one or more factors that maximize the output of the function $f$ to determine the difference between, for example, an idealized risk entity and a particular entity. The output-maximizing value of a given factor is indicated by superscript m in the various functions described below. The output-maximizing value of a given factor can be determined, in each case, by examining the monotonicity requirements that were enforced in the process 300. For the common factors $F_j$, a monotonic relationship is required. The output-maximizing value is the left or right endpoint of the domain of a given common factor. In some aspects involving the use of the specific factors $\varepsilon_i$, a monotonic relation is imposed on the specific factors. The output-maximizing value is the left or right endpoint of the domain of a given specific factor.

Explanatory data (e.g., a reason code) can be generated using relevant factors (e.g., common factors alone, common factors and certain specific factors, etc.). For example, a processor (e.g., the computing environment 106 or automated modeling system 124) can use the neural network to compute risk-indicator decreases for the relevant factors. A risk-indicator decrease can be an amount by which a risk indicator decreases in the function $f$, where the decrease is caused by varying the value of one factor (e.g., a common factor or specific factor) while holding the values of other factors constant.

Explanatory Data Examples Generated from Common Factors and Constant Specific Factor Values In some aspects, computing each risk-indicator decrease involves calculating or otherwise determining a respective maximum value of the risk indicator using a value of the common factor under consideration that maximizes the function $f$. A decreased value of the risk indicator is also calculated or otherwise determined using an entity's value of the common factor under consideration. The entity's value may be different from the output-maximizing value of the common factor under consideration.

The processor also calculates or otherwise determines, for the common factor under consideration, the risk-indicator decrease from the maximum value of the risk indicator and the decreased value of the risk indicator. In the computations of the risk-indicator decreases for the set of common factors, constant values of the specific factors are used. The processor can generate reason codes or other explanatory data by rank-ordering the various risk-indicator decreases. In some aspects, reason codes can be generated using the common factors that resulted in the largest risk-indicator decreases from a set of risk-indicator decreases.

In one example, the following function is used for computing a risk-indicator decrease for a common factor $F_j$:

$$f(F_1^m, \ldots, F_q^m, \varepsilon_1, \ldots, \varepsilon_n) - f(F_1^m, \ldots, F_j, \ldots, F_q^m, \varepsilon_1, \ldots, \varepsilon_n).$$

In this example, a risk-indicator decrease for the common factor $F_j$ is computed using a difference between (i) a maximum value of the risk indicator (or other output of function $f$) and (ii) a decreased value of the risk indicator (or other output of function $f$). The maximum value is computed using the output-maximizing values for the common factors F (including the common factor $F_j$) and constant values for the specific factors $\varepsilon$. The decreased value of the risk indicator is computed using an entity's value for the common factor $F_j$, the output-maximizing values for the other common factors, and constant values (e.g., the entity's values) for the specific factors.

In another example, the following function is used for computing risk-indicator decreases for the common factor $F_j$:

$$(F_1, \ldots, F_j^m, \ldots, F_q, \varepsilon_1, \ldots, \varepsilon_n) - f(F_1, \ldots, F_q, \varepsilon_1, \ldots, \varepsilon_n).$$

In this example, each risk-indicator decrease is computed using a difference between (i) a maximum value of the risk indicator (or other output of function $f$) and (ii) a decreased value of the risk indicator (or other output of function $f$). The maximum value is computed using the output-maximizing value of the common factor $F_j$ (indicated by $F_j^m$), non-maximizing values selected for the other common factors F, and constant values (e.g., the entity's values) for the specific factors $\varepsilon$. The decreased value of the risk indicator is computed using an entity's value for the common factor $F_j$, the non-maximizing values selected for the other common factors, and constant values for the specific factors $\varepsilon$.

Explanatory Data Examples Using Common Factors and Specific Factors

In additional or alternative aspects, explanatory data (e.g., a reason code) is generated using changes in the common factors and changes in the specific factors. For example, a processor (e.g., the computing environment 106 or automated modeling system 124) can use the neural network to compute risk-indicator decreases for each of the common factors and each of the specific factors associated with an optimized neural network. These aspects can involve enforcing monotonicity and VIF constraints on the specific factors by adjusting the neural network, the factor analysis, or both.

In some aspects, adjusting the neural network or factor analysis to account for monotonicity and VIF constraints on the specific factors may be desirable if, for example one or more specific factors have a relatively large variance in comparison to the common factors. In additional or alternative aspects, adjusting the neural network or factor analysis to account for monotonicity and VIF constraints on the specific factors may be desirable if one or more specific factors has the incorrect sign with respect to the risk indicator (e.g., a specific factor associated with an increased number of bankruptcies increasing a credit score).

In one example, risk-indicator decreases are computed using the following functions:

$$f(F_1{}^m, \ldots, F_q{}^m, \varepsilon_1{}^m, \ldots, \varepsilon_n{}^m) - f(F_1{}^m, \ldots, F_j, \ldots, F_q{}^m, \varepsilon_1{}^m, \ldots, \varepsilon_n{}^m), \text{ and}$$

$$f(F_1{}^m, \ldots, F_q{}^m, \varepsilon_1{}^m, \ldots, \varepsilon_n{}^m) - f(F_1{}^m, \ldots, F_q{}^m, \varepsilon_1{}^m, \ldots, \varepsilon_i, \ldots, \varepsilon_n{}^m).$$

In this example, a first set of risk-indicator decreases is computed for the common factors, and a second set of risk-indicator decreases is computed for the specific factors. Each risk-indicator decrease for a common factor is computed using a difference between (i) a maximum value of the risk indicator (or other output of function $f$) and (ii) a decreased value of the risk indicator (or other output of function $f$). The maximum value is computed using the output-maximizing values for the common factors F and the output-maximizing values for the specific factors $\varepsilon$. The decreased value of the risk indicator is computed using an entity's value for one of the common factors (i.e., the common factor $F_j$), the output-maximizing values for the other common factors, and the output-maximizing values for the specific factors.

Continuing with the example above, each risk-indicator decrease for a specific factor is computed using a difference between (i) a maximum value of the risk indicator (or other output of function $f$) and (ii) a decreased value of the risk indicator (or other output of function $f$). The maximum value is computed using the output-maximizing values for the common factors F and output-maximizing values for the specific factors $\varepsilon$. The decreased value of the risk indicator is computed using an entity's value for one of the specific factors (i.e., the specific factor $\varepsilon_i$), the output-maximizing values for the other specific factors, and the output-maximizing values for the common factors.

In another example, risk-indicator decreases are computed using the following functions:

$$f(F_1, \ldots, F_j{}^m, \ldots, F_q, \varepsilon_1, \ldots, \varepsilon_n) - f(F_1, \ldots, F_q, \varepsilon_1, \ldots, \varepsilon_n), \text{ and}$$

$$f(F_1, \ldots, F_q, \varepsilon_1, \ldots, \varepsilon_i{}^m, \ldots, \varepsilon_n) - f(F_1, \ldots, F_q, \varepsilon_1, \ldots, \varepsilon_n).$$

In this example, a first set of risk-indicator decreases is computed for the common factors, and a second set of risk-indicator decreases is computed for the specific factors. Each risk-indicator decrease for a respective common factor is computed using a difference between (i) a maximum value of the risk indicator (or other output of function $f$) and (ii) a decreased value of the risk indicator (or other output of function $f$). The maximum value is computed using the output-maximizing value of the common factor $F_j$ (indicated by $F_j{}^m$), non-maximizing values selected for the other common factors F, and non-maximizing values selected for the specific factors. The decreased value of the risk indicator is computed using an entity's value for the common factor $F_j$, the non-maximizing values selected for the other common factors F, and the non-maximizing values selected for the specific factors.

Continuing with the example above, each risk-indicator decrease for a respective specific factor is computed using a difference between (i) a maximum value of the risk indicator (or other output of function $f$) and (ii) a decreased value of the risk indicator (or other output of function $f$). The maximum value is computed using the output-maximizing value of the specific factor $\varepsilon_i$ (indicated by $\varepsilon_i{}^m$), non-maximizing values selected for the other specific factors $\varepsilon$, and non-maximizing values selected for the common factors F. The decreased value of the risk indicator is computed using an entity's value for the specific factor $\varepsilon_i$, the non-maximizing values selected for the other specific factors $\varepsilon$, and the non-maximizing values selected for the common factors F.

In some aspects, the functions identified above can be applied to a neural network in which monotonicity constraints, VIF constraints, or both have not been applied to the specific factors. In these aspects, the functions identified in the examples above can be applied after eliminating certain connections from the input layer to the first hidden layer in the neural network. Such connections include (i) those not in accordance with the expected trend between specific factors and the risk indicator as determined by the neural network and (ii) those involving violations of VIF constraints by specific factors, or both. This operation may be iterated to improve a model fit, and may lead to a partially connected neural network.

Explanatory Data Examples Using Common Factors and Zero Values for all Specific Factors The examples above may involve using a neural network that is optimized or otherwise adjusted by enforcing monotonicity and VIF constraints on the specific factors. But, in other aspects, operations for enforcing monotonicity and VIF constraints on the specific factors may be omitted. In these aspects, either of the following functions may be used for computing risk-indicator decreases for common factors:

$$f(F_1{}^m, \ldots, F_q{}^m, 0, \ldots, 0) - f(F_1{}^m, \ldots, F_j, \ldots, F_q{}^m, 0, \ldots, 0), \text{ or}$$

$$f(F_1, \ldots, F_j{}^m, \ldots, F_q, 0, \ldots, 0) - f(F_1, \ldots, F_q, 0, \ldots, 0).$$

Values of zero are assigned to the specific factors in these functions. In some aspects, capping and flooring bands can be applied to the difference $f(F_1, \ldots, F_q, \varepsilon_1, \ldots, \varepsilon_n) - f(F_1, \ldots, F_q, 0, \ldots, 0)$ between the actual score and an approximating score to control the impact of the specific factors $\varepsilon_i$. In other aspects, the common factors $F_j$ may be used by eliminating all specific factors $\varepsilon_i$ (i.e., setting all $\varepsilon_i = 0$).

Explanatory Data Examples Using Common Factors and Zero Values for Certain Specific Factors In additional or alternative aspects, values of zero may be assigned to a subset of the specific factors that violate monotonicity constraints, and non-zero values of specific factors may be otherwise used for computing explanatory data. In these aspects, the following functions may be used for computing risk-indicator decreases for common factors and for some of the specific factors:

$$f(F_1{}^m, \ldots, F_q{}^m, \varepsilon_1{}^m, \ldots, \varepsilon_n{}^m) - f(F_1{}^m, \ldots, F_j, \ldots, F_q{}^m, \varepsilon_1{}^m, \ldots, \varepsilon_n{}^m), \text{ and}$$

$$f(F_1{}^m, \ldots, F_q{}^m, \varepsilon_1{}^m, \ldots, \varepsilon_n{}^m) - f(F_1{}^m, \ldots, F_q{}^m, \varepsilon_1{}^m, \ldots, \varepsilon_i, \ldots, \varepsilon_n{}^m).$$

In these functions, zero values can be assigned to specific factors that violate monotonicity constraints. For instance, if the specific factor $\varepsilon_2$ violates monotonicity constraints, the formulas above can be modified as follows:

$$f(F_1^m, \ldots, F_q^m, \varepsilon_1^m, 0, \varepsilon_3^m, \ldots, \varepsilon_n^m) - f(F_1^m, \ldots, F_j, \ldots, F_q^m, \varepsilon_1^m, 0, \varepsilon_3^m, \ldots, \varepsilon_n^m), \text{ and}$$

$$f(F_1^m, \ldots, F_q^m, \varepsilon_1^m, 0, \varepsilon_3^m, \ldots, \varepsilon_n^m) - f(F_1^m, \ldots, F_q^m, \varepsilon_1^m, 0, \varepsilon_3^m, \ldots, \varepsilon_i, \ldots, \varepsilon_n^m).$$

Additionally or alternatively, the following functions may be used for computing risk-indicator decreases for common factors and for some of the specific factors:

$$f(F_1, \ldots, F_j^m, F_q, \varepsilon_1, \ldots, \varepsilon_n) - f(F_1, \ldots, F_q, \varepsilon_1, \ldots, \varepsilon_n), \text{ and}$$

$$f(F_1, \ldots, F_q, \varepsilon_1, \ldots, \varepsilon_i^m, \ldots, \varepsilon_n) - f(F_1, \ldots, F_q, \varepsilon_1, \ldots, \varepsilon_n).$$

As in the other example above, zero values can be assigned to specific factors that violate monotonicity constraints. For instance, if the specific factor $\varepsilon_2$ violates monotonicity constraints, the formulas above can be modified as follows:

$$f(F_1, \ldots, F_j^m, \ldots, F_q, \varepsilon_1, 0, \varepsilon_3, \ldots, \varepsilon_n) - f(F_1, \ldots, F_q, \varepsilon_1, 0, \varepsilon_3, \ldots, \varepsilon_n), \text{ and}$$

$$f(F_1, \ldots, F_q, \varepsilon_1, 0, \varepsilon_3, \ldots, \varepsilon_i^m, \ldots, \varepsilon_n) - f(F_1, \ldots, F_q, \varepsilon_1, 0, \varepsilon_3, \ldots, \varepsilon_i, \ldots, \varepsilon_n).$$

In aspects involving these and other examples, values of zero are assigned to a subset of the specific factors having non-monotonic or incorrectly signed relationships with respect to the risk indicator (or other predictive output). A first set of risk-indicator decreases is computed for the common factor, and a second set of risk-indicator decreases is computed for a second subset of the specific factors. These non-zeroed specific factors have monotonic relationships with respect to the risk indicator (or other predictive output).

In these aspects, each risk-indicator decrease for a common factor $F_j$ is computed using a difference between (i) a maximum value of the risk indicator (or other output of function $f$) and (ii) a decreased value of the risk indicator (or other output of function $f$). The maximum value is computed using the following: an output-maximizing value for the common factor $F_j$ (i.e., $F_j^m$); a set of maximizing or non-maximizing values for the other common factors; a set of zero values for the first subset of the specific factors; and a set of maximizing or non-maximizing values for the second subset of the specific factors. The decreased value of the risk indicator is computed using the following: a reduced value for the common factor $F_j$; the set of maximizing or non-maximizing values for the other common factors; the set of zero values for the first subset of the specific factors; and the set of maximizing or non-maximizing values for the second subset of the specific factors.

In these aspects, each risk-indicator decrease for a specific factor $\varepsilon_i$ (i.e., a specific factor to which a zero value is not assigned) is also computed using a difference between (i) a maximum value of the risk indicator (or other output of function $f$) and (ii) a decreased value of the risk indicator (or other output of function $f$). The maximum value is computed using the following: an output-maximizing value for the specific factor $\varepsilon_i$ (i.e., $\varepsilon_i^m$); a set of maximizing or non-maximizing values for the common factors; a set of zero values for the first subset of the specific factors; and a set of maximizing or non-maximizing values for other specific factors in the second subset of the specific factors. The decreased value of the risk indicator is computed using the following: a reduced value for the specific factor $\varepsilon_i$; the set of maximizing or non-maximizing values for the common factors; the set of zero values for the first subset of the specific factors; and the set of maximizing or non-maximizing values for other specific factors in the second subset of the specific factors.

Selection of Predictor Variables for Model Optimization

In some aspects, the model development engine 108 can identify the predictor variables used in the process 300 by, for example, identifying a set of candidate predictor variables, determining bivariate relationships between the candidate predictor variable and a certain outcome (e.g., a good/bad odds ratio), and transforming, based on the identified bivariate relationships, the set of candidate predictor variables into the predictor variables.

Figure 4:
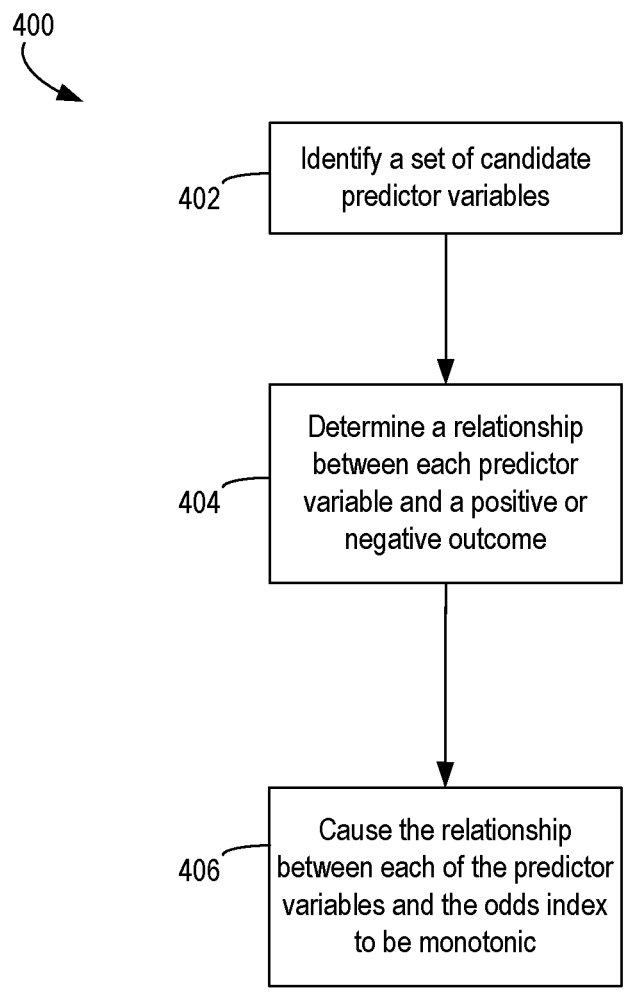
FIG. 4 is a flow chart depicting an example of a process for identifying predictor variable to be used in the optimization process of FIG. 3, according to certain aspects of the present disclosure

For example, FIG. 4 is a flow chart depicting an example of a process 400 for identifying predictor variables to be used in optimizing a neural network model (or other suitable model for an automated modeling algorithm). For illustrative purposes, the process 400 is described with reference to the implementation depicted in FIGS. 1-3 and various other examples described herein. But other implementations are possible.

In block 402, the process 400 involves identifying a set of candidate predictor variables. For example, the model development engine 108 can obtain the predictor variables from a predictor variable database or other data structure stored in the network-attached data stores 110.

In block 404, a relationship or correlation between each predictor variable and a positive or negative outcome is determined. In some aspects, the model development engine 108 determines the correlation (e.g., using the predictor variable analysis module 204 of FIG. 2). For example, the model development engine 108 can perform an exploratory data analysis on a set of candidate predictor variables, which involves analyzing each predictor variable and determining the bivariate relationship between each predictor variable and an odds index. The odds index indicates a ratio of positive to negative outcomes. In some aspects, a measure (e.g., correlation) on the bivariate relationship between the predictor variable and the odds index can be used to determine (e.g., quantify) a predictive strength of the predictor variable with respect to the odds index. The predictive strength of the predictor variable can indicate an extent to which the predictor variable can be used to accurately predict a positive or negative outcome or a likelihood of a positive or negative outcome occurring based on the predictor variable.

In block 406, the model development engine 108 can cause the relationship between each of the predictor variables and the odds index to be monotonic (e.g., using the treatment module 206 of FIG. 2). A monotonic relationship exists between the predictor variable and the odds index if a value of the odds index increases as a value of the predictor variable increases or if the value of the odds index decreases as the value the predictor variable increases.

The model development engine 108 can identify or determine a set of predictor variables that have a monotonic relationship with one or more odds indices (e.g., using the predictor variable reduction module 208 of FIG. 2). In some aspects, the model development engine 108 can also reject or remove predictor variables that do not have a monotonic relationship with one or more odds indices.

Example of an Optimized Neural Network and Explanatory Data

Figure 5:
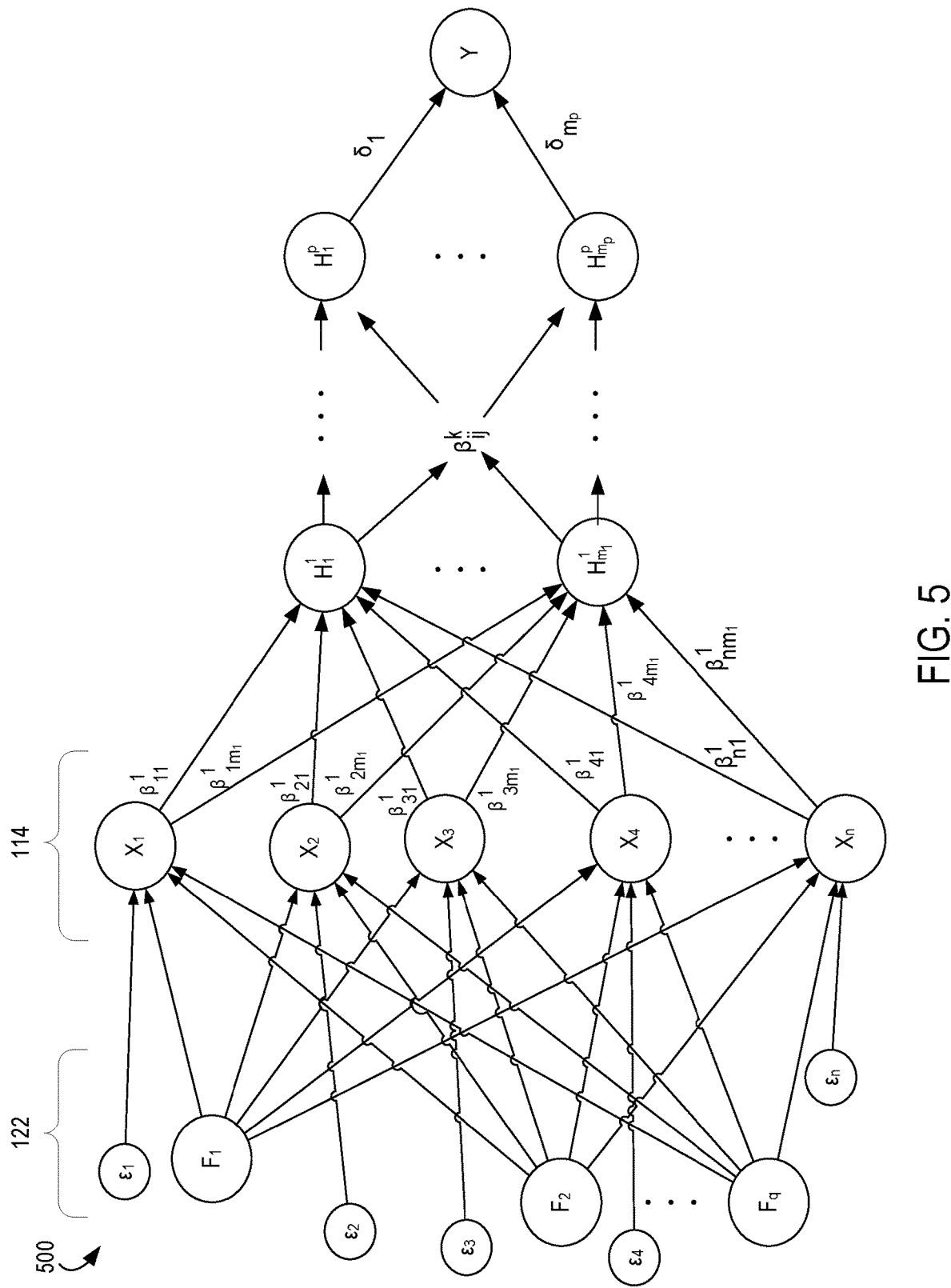
FIG. 5 is a diagram depicting an example of a neural network that can be optimized, using the model development engine of FIGS. 1 and 2, for assessing risks and generating explanatory data regarding the impact of factors that drive or otherwise affect predictor variables, according to certain aspects of the present disclosure.

Any suitable neural network model can be optimized using the model development engine 108. As an example, FIG. 5 is a diagram depicting an example of a neural network 500 with explanatory data capabilities that can be generated and optimized by the model development engine 108 of FIGS. 1 and 2. In the example depicted in FIG. 5, the multi-layer neural network 500 is a feed-forward neural network coupled with common and specific factors from a factor analysis. The neural network 500 having explanatory data capabilities includes n input nodes that represent predictor variables, $m_k$ hidden nodes in the $k^{th}$ hidden layer, p hidden layers, q nodes that represent common factors, and n nodes that represent specific factors. The neural network 500 with explanatory data capabilities includes input nodes $X_1$ through $X_n$. The input nodes $X_1$ through $X_n$ represent predictor variables 114. The nodes $F_1$ through $F_q$ represent common factors 122 and the nodes $\varepsilon_1$ through $\varepsilon_n$ represent specific factors 122. The node Y in FIG. 5 represents a risk indicator that can be determined using the predictor variables 114.

Neural networks with any number of hidden layers can be optimized using the operations described herein. In some aspects, a neural network can include multiple layers of hidden nodes that represent intermediate values. In other aspects, a neural network can include a single layer (p=1) of hidden nodes $H_1$ through $H_m$ that represent intermediate values. (In this simplified example involving one layer of hidden nodes, the superscripts indicating the first hidden layer are suppressed.) In this example, the model development engine 108 can use the following equations to represent the various nodes and operations of a single-layer neural network with explanatory data capabilities:

$$H_j = \frac{1}{1+\exp(-x\beta^j)}, Y = \frac{1}{1+\exp(-H\delta)}, \quad (1)$$

$$X = [1, X_1, \ldots, X_n], H = [1, H_1, \ldots, H_m], \quad (2)$$

$$\beta^j = [\beta_{0j}, \beta_{1j}, \ldots, \beta_{nj}]^T, \delta = [\delta_0, \delta_1, \ldots, \delta_m]^T \quad (3)$$

$$\frac{X_i - \mu_i}{\sigma_i} = \sum_{s=1}^{q} l_{is} F_s + \varepsilon_i, i = 1, \ldots, n \text{ and } s = 1, \ldots, q. \quad (4)$$

For instance, in this simplified example involving one layer of hidden nodes, a single-layer neural network can use the predictor variables $X_1$ through $X_n$ as input values for determining the intermediate values $H_1$ through $H_m$. Numeric weights or coefficients $\beta_{11}$ through $\beta_{nm}$ are used to determine the intermediate values $H_1$ through $H_m$ based on predictor variables $X_1$ through $X_n$. The neural network uses numeric weights or coefficients $\delta_1$ through $\delta_m$ to determine the risk indicator Y based on the intermediate values $H_1$ through $H_m$. In this manner, the neural network can map the predictor variables $X_1$ through $X_n$ (as well as their associated factors) by receiving the predictor variables $X_1$ through $X_n$, providing the predictor variables $X_1$ through $X_n$ to the hidden nodes $H_1$ through $H_m$ for transforming the predictor variables into intermediate values using coefficients $\beta_{11}$ through $\beta_{nm}$, transforming the intermediate variables $H_1$ through $H_m$ using the coefficients $\delta_1$ through $\delta_m$, and providing the risk indicator Y. The explanatory data can use the predictor variables $X_1$ through $X_n$ as input values for determining the common factors $F_1$ through $F_q$ and specific factors $\varepsilon_1$ through $\varepsilon_n$. The explanatory data uses numeric weights or coefficients $l_{11}$ through $l_{nq}$, called loadings, to relate the predictor variables $X_1$ through $X_n$ to the common factors $F_1$ through $F_q$ and specific factors $\varepsilon_1$ through $\varepsilon_n$.

In this single-layer neural network with explanatory data capabilities, the mapping $\beta_{ij}:X_i \to H_j$ provided by each coefficient $\beta$ maps the $i^{th}$ predictor variable to $j^{th}$ hidden node, where i has values from 0 to n and j has values from 1 to m. The mapping $\delta_j:H_j \to Y$ maps the $j^{th}$ hidden node to an output (e.g., a risk indicator). In this simplified example involving a single-layer neural network, each of the hidden nodes $H_1$ through $H_m$ can be modeled as a logistic function a weighted sum of the predictor variables $X_i$, and Y is a logistic function of a weighted sum of the hidden nodes. The factor loading $l_{is}$ measures the contribution of the $s^{th}$ common factor $F_s$ on the $i^{th}$ predictor variable $X_i$.

In this example, the risk indicator Y can be monotonic with respect to each of the common factors $F_1$ through $F_q$ in the neural network with explanatory data capabilities. In credit decision applications, the risk indicator Y can be monotonic for each of the consumers (e.g., individuals or other entities) in the sample data set used to generate the neural network model.

In some aspects, the model development engine 108 depicted in FIGS. 1 and 2 can use the neural network to determine a value for the risk indicator Y and the factor analysis to generate explanatory data. As an example, in credit decision applications, the risk indicator Y may be a modeled probability of a binary random variable associated with the risk indicator. The explanatory data can be a description of the common factors and their impact on the risk indicator Y. Optionally, the explanatory data can also include the specific factors and their impact on the risk indicator Y. Y can be continuous with respect to the predictor variables $X_1$ through $X_n$. In some aspects, the model development engine 108 can use a single-layer version of the feed-forward neural network 500 having explanatory data capabilities for risk assessment, where at least the corresponding common factors $F_1$ through $F_q$ comply with the monotonicity and multicollinearity constraints described herein. The neural network 500 can be used by the model development engine 108 to determine a value for a continuous variable Y that represents a risk indicator or other output probability.

For example, the model development engine 108 can determine the monotonicity of a modeled relationship for each common factor $F_s$ and, in some aspects, with respect to each specific factor $\varepsilon_i$, with the continuous variable Y. This involves analyzing a change in Y with respect to each common factor $F_s$ and, in some aspects, with respect to each specific factor $\varepsilon_i$. This can allow the model development engine 108 to determine the effect of each relevant factor on the risk indicator Y. Y increases on an interval if and only if $H\delta$ increases, since the logistic function is monotonically increasing. The model development engine 108 can determine whether $H\delta$ is increasing by analyzing a partial derivative $$\frac{\partial}{\partial F_s}(H\delta)$$

or, for specific factors $$\frac{\partial}{\partial \varepsilon_i}(H\delta).$$

In an example involving common factors, the model development engine 108 can determine the partial derivative with respect to the common factor $F_s$ using the following equation:

$$\frac{\partial}{\partial F_s}(H\delta) = \sum_{i=1}^{n} \frac{\partial}{\partial X_i}(H\delta)\frac{\partial X_i}{\partial F_s} = \quad (5)$$

$$\sum_{i=1}^{n}\left(\sum_{j=1}^{m}\delta_j\frac{\partial H_j}{\partial F_q}\right)(\sigma_i \ell_{is}) = \sum_{i=1}^{n}\sum_{j=1}^{m}\sigma_i \ell_{is}\beta_{ij}\delta_j \frac{\exp(-X\beta^j)}{(1+\exp(-X\beta^j))^2}.$$

In examples involving specific factors, the model development engine 108 can determine the partial derivative with respect to the specific factor $\varepsilon_i$ using the following equation:

$$\frac{\partial}{\partial \varepsilon_i}(H\delta) = \frac{\partial}{\partial X_i}(H\delta)\frac{\partial X_i}{\partial \varepsilon_i} = \sigma_i \sum_{j=1}^{m}\beta_{ij}\delta_j \frac{\exp(-X\beta^j)}{(1+\exp(-X\beta^j))^2}. \quad (6)$$

A modeled score can depend upon the cumulative effect of multiple connections between a given factor (i.e., a common factor or specific factor) and the risk indicator. In the equations (5) and (6) above, the score's dependence on each relevant factor (i.e., each common factor $F_s$ or specific factor $\varepsilon_i$) can be an aggregation of multiple possible connections from a node representing the factor to Y. Each product $\sigma_i l_{is}\beta_{ij} \delta_j$ in the double summation of the equation (5) above can represent the coefficient mapping from each common factor $F_s$ to Y through the $i^{th}$ predictor variable $X_i$ and the $j^{th}$ hidden node $H_j$. Typically, a neural network is fit on standardized predictor variables, in which case $\sigma_i$=1. Each product $\sigma_i\beta_{ij} \delta_j$ in the summation of the equation (6) above can represent the coefficient mapping from each specific factor $\varepsilon_i$ to Y through the $i^{th}$ predictor variable $X_i$ and the $j^{th}$ hidden node $H_j$. The remaining term in the product of each equation above can be bounded by $$0 < \frac{\exp(-X\beta^j)}{(1+\exp(-X\beta^j))^2} \leq \frac{1}{4}$$

and acts as a varying tempering effect on each connection of $F_s$ or $\varepsilon_i$ to Y. In credit decision applications, this term can be dependent upon a consumer's position on the score surface.

In equation (5), if each product $\sigma_i l_{is}\beta_{ij}\delta_j$ in the double summation has the same sign (e.g. $\sigma_i l_{is}\beta_{ij}\delta_j \geq 0$ for every value of i and j), then the modeled risk indicator Y is monotonic in the common factor $F_s$. Therefore, Y is monotonic in the common factor $F_s$ for every consumer in the sample. In equation (6), if each product $\beta_{ij}\delta_j$ in the summation has the same sign (e.g. $\beta_{ij}\delta_j \geq 0$ for every value of j), then the modeled risk indicator Y is monotonic in the specific factor $\varepsilon_i$. Therefore, Y is monotonic in the specific factor $\varepsilon_i$ for every consumer in the sample.

The case above (i.e., wherein Y is monotonic in every common factor $F_s$, s=1, . . . , q as a result of requiring each product $\sigma_i l_{is}\beta_{ij}\delta_j$ for each fixed s, s=1, . . . , q, to be the same sign) can be a limiting base case. For example, $\beta_{ij}$ can be set to 0 for those products $\sigma_i l_{is}\beta_{ij}\delta_j$ that have an unexpected sign. Optionally, the case above (i.e., wherein Y is monotonic in every specific factor $\varepsilon_i$, i=1, . . . , n by requiring each product $\beta_{ij}\delta_j$ for each fixed i, i=1, . . . , n to be of the same sign) can be included in a limiting base case. For example, $\beta_{ij}$ can be set to 0 for those products $\beta_{ij}\delta_j$ that have an unexpected sign. Therefore, a feed-forward neural network with a single hidden layer and explanatory data capabilities (e.g., a single-layer version of the neural network 500 having explanatory data capabilities) can be reduced to a model where Y is monotonic in each common factor and, optionally, each specific factor. Therefore, the process for optimizing the neural network, which utilizes analyzing the partial derivatives described herein, can successfully terminate in a case where Y is monotonic in each relevant factor.

Upon termination in a case where Y is monotonic in each relevant factor, the model development engine 108 can determine the variance inflation measure (e.g., a VIF) of the relevant factors. A VIF is a measure of multicollinearity in the relevant factors. This VIF measurement is implemented in suitable statistical software packages. A suitable software package can be executed by the model development engine 108 to compute the VIF of each relevant factor. For example, the model development engine can execute the optimization module 212 to compute the VIF of each relevant factor. If any factors exhibits a VIF above a given threshold, the factor analysis may be adjusted, predictor variables may be removed from the model, or both. Any set of relevant factors can always be reduced to a first subset of relevant factors with VIF below a given threshold. In a limiting base case, only the first subset contains a single relevant factor.

In some aspects, a feed-forward neural network with a single hidden layer may approximate with arbitrary precision any continuous function, but residual error may exist in practical applications. For example, in credit decision applications, the input predictor variables $X_1$ through $X_n$ may not fully account for consumer behavior and may only include a subset of the dimension captured by a credit file. In these aspects, the performance of a neural network that models the probability of a binary random variable may be improved by applying a more general feed-forward neural network with multiple hidden layers.

For instance, the examples described above can be extended to the multi-layer neural network 500 with explanatory data capabilities depicted in FIG. 5. This neural network 500 with explanatory data capabilities includes n input nodes that represent predictor variables, $m_k$ hidden nodes in the $k^{th}$ hidden layer, p hidden layers, q nodes that represent common factors, and n nodes that represent specific factors. The neural network 500 can have any differentiable sigmoid activation function $\varphi: \mathbb{R} \to \mathbb{R}$ that accepts real number inputs and outputs a real number. Examples of activation functions include, but are not limited to the logistic, arc-tangent, and hyperbolic tangent functions. These activation functions are implemented in numerous statistical software packages to fit neural networks.

In the multi-layer neural network 500 that has explanatory capabilities, the variable $H_j^k$ can denote the $j^{th}$ node in the $k^{th}$ hidden layer. For convenience, denote $H_i^0 = X_i$ and $m_0 = n$. In FIG. 5, $\beta_{ij}^k : H_i^{k-1} \to H_j^k$, where i=0, . . . , $m_{k-1}$, j=1, . . . , $m_k$, and k=1, . . . , p, is the mapping of the $i^{th}$ node in the $(k-1)^{th}$ layer to the $j^{th}$ node in the $k^{th}$ layer. Furthermore, $\delta_j: H_j^p \to Y$, where j=0, . . . , $m_p$, is the mapping of the $j^{th}$ node in the $p^{th}$ hidden layer to the risk indicator Y. The factor loading $l_{is}$ measures the contribution of the $s^{th}$ common factor $F_s$ on the $i^{th}$ predictor variable $X_i$. The model depicted in FIG. 5 is then specified as:

$$H_j^k = \varphi(H^{k-1}\beta_{\cdot j}^k), \quad Y = \varphi(H^p \delta), \quad (7)$$

$$H^0 = X = [1, X_1, \ldots, X_n], \quad H^k = [1, H_1^k, \ldots, H_{m_k}^k], \quad (8)$$

$$\beta_{\cdot j}^k = [\beta_{0j}^k, \beta_{1j}^k, \ldots, \beta_{m_{k-1}j}^k]^T, \quad \delta = [\delta_0, \delta_1, \ldots, \delta_{m_p}]^T \quad (9)$$

-continued $$\frac{X_i - \mu_i}{\sigma_i} = \sum_{s=1}^{q} \ell_{is} F_s + \varepsilon_i, \, i = 1, \ldots, n \text{ and } s = 1, \ldots, q. \quad (10)$$

As in the example above having a single hidden layer, the model development engine 108 can produce models of the form represented in FIG. 5 in which at least the common factors (and, in some aspects, the specific factors) comply with monotonicity and multicollinearity constraints.

In the process 300 described above, block 312 can be executed for a neural network 500 with explanatory data capabilities. Any suitable process can be used to asses a relationship between a factor (e.g., a common factor or specific factor) in the neural network 500 and a risk indicator (or other predictive or analytical outputs). In some aspects, the model development engine 108 can determine the relationship between each relevant factor and the risk indicator (e.g., by using the optimization module 212 of FIG. 2). For example, the model development engine 108 can determine whether the modeled score Y exhibits a monotonic relationship with respect to each common factor $F_s$ and, in some aspects, with respect to each specific factor $\varepsilon_i$. A monotonic relationship exists between each relevant factor and the risk indicator when either: i) a value of the risk indicator increases as a value of the relevant factor increases; or ii) when the value of the risk indicator decreases as the value of the relevant factor decreases. In some aspects, the model development engine 108 generalizes to produce neural network models with multiple hidden layers such that the modeled risk indicator Y is monotonic with respect to each relevant factor.

A generalized version of the process described above herein can be used in a risk modeling process. For example, in a general case, the model development engine 108 can assess the monotonicity of the modeled relationship of each factor with Y for neural networks with the multi-layer architecture described above with respect to FIG. 5. The model development engine 108 is used to analyze the effect of a factor on the log-odds scale score $H^p \delta$. In an example involving common factors, the partial derivative is computed as:

$$\frac{\partial}{\partial F_s}(H^p \delta) = \sum_{i=1}^{n} \frac{\partial}{\partial X_i}(H^p \delta) \frac{\partial X_i}{\partial F_s} = \quad (11)$$

$$\sum_{i=1}^{n} \sigma_i \ell_{is} \left( \sum_{j_p=1}^{m_p} \sum_{j_{p-1}=1}^{m_{p-1}} \sum_{j_{p-2}=1}^{m_{p-2}} \cdots \sum_{j_2=1}^{m_2} \sum_{j_1=1}^{m_1} \delta_{j_p} \beta_{j_{p-1} j_p}^{p} \beta_{j_{p-2} j_{p-1}}^{p-1} \cdots \right.$$

$$\beta_{j_2 j_3}^{3} \beta_{j_1 j_2}^{2} \beta_{ij_1}^{1} \cdot \varphi'(H^{p-1} \beta_{.j_p}^{p}) \varphi'(H^{p-2} \beta_{.j_{p-1}}^{p-1})$$

$$\left. \ldots \varphi'(H^2 \beta_{.j_3}^{3}) \varphi'(H^1 \beta_{.j_2}^{2}) \varphi'(X \beta_{.j_1}^{1}) \right).$$

In examples involving specific factors, the partial derivative is computed as:

$$\frac{\partial}{\partial \varepsilon_i}(H^p \delta) = \frac{\partial}{\partial X_i}(H^p \delta) \frac{\partial X_i}{\partial \varepsilon_i} = \quad (12)$$

$$\sigma_i \sum_{j_p=1}^{m_p} \sum_{j_{p-1}=1}^{m_{p-1}} \sum_{j_{p-2}=1}^{m_{p-2}} \cdots \sum_{j_2=1}^{m_2} \sum_{j_1=1}^{m_1} \delta_{j_p} \beta_{j_{p-1} j_p}^{p} \beta_{j_{p-2} j_{p-1}}^{p-1} \cdots$$

$$\beta_{j_2 j_3}^{3} \beta_{j_1 j_2}^{2} \beta_{ij_1}^{1} \cdot \varphi'(H^{p-1} \beta_{.j_p}^{p}) \varphi'(H^{p-2} \beta_{.j_{p-1}}^{p-1})$$

$$\ldots \varphi'(H^2 \beta_{.j_3}^{3}) \varphi'(H^1 \beta_{.j_2}^{2}) \varphi'(X \beta_{.j_1}^{1})$$

As with single hidden layer neural networks, the score's dependence on each factor is an aggregation of all possible connections from a node representing a relevant factor (e.g., $F_s$ or $\varepsilon_i$) to Y. Since $\varphi$ is a differentiable sigmoid function on $\mathbb{R}$, $\varphi'(x)>0$ for every $x \in \mathbb{R}$. The sign of equation (11) above depends upon a tempered aggregation of each product $\sigma_i \ell_{is} \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1}$, which maps $F_s$ to Y through the predictor variable $X_i$ and the nodes $H_{j_1}^1$, $H_{j_2}^2, \ldots, H_{j_R}^p$. If each product $\sigma_i \ell_{is} \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1}$ in the nested summation has the same sign (e.g. $\sigma_i \ell_{is} \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1} \geq 0$ for every value of i and the j's), then the modeled risk indicator Y is monotonic in the common factor $F_s$. Therefore, Y is monotonic in the common factor $F_s$ for every consumer in the sample.

In equation (12), if each product $\sigma_i \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1}$ in the summation has the same sign (e.g. $\sigma_i \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1} \geq 0$ for every value of the j's), then the modeled risk indicator Y is monotonic in the specific factor $\varepsilon_i$. Therefore, Y is monotonic in the specific factor $\varepsilon_i$ for every consumer in the sample. The case above (i.e., where Y is monotonic in every common factor $F_s$, $s=1, \ldots, q$ by requiring each product $\sigma_i \ell_{is} \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1}$ for each fixed s, $s=1, \ldots, q$ to be the same sign) can be a limiting base case. For example, $\beta_{ij_1}^{1}$ can be set to 0 for those products $\sigma_i \ell_{is} \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1}$ that have an unexpected sign. Optionally, the case above (i.e., where Y is monotonic in every specific factor $\varepsilon_i$, $i=1, \ldots, n$ by requiring each product $\sigma_i \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1}$ for each fixed i, $i=1, \ldots, n$ to be of the same sign) can be included in a limiting base case. For example, $\beta_{ij_1}^{1}$ can be set to 0 for those products $\sigma_i \delta_{j_p} \beta_{j_{p-1} j_p}^{p} \beta_{j_{p-2} j_{p-1}}^{p-1} \cdots \beta_{j_2 j_3}^{3} \beta_{j_1 j_2}^{2} \beta_{ij_1}^{1}$ that have an unexpected sign. Therefore, a feed-forward neural network with multiple hidden layers and explanatory data capabilities (e.g., the multi-layer neural network 500 with explanatory data capabilities) can be reduced to a model where Y is monotonic in each common factor and, optionally, each specific factor. Therefore, the process for optimizing the neural network, which utilizes analyzing the partial derivatives described herein, can successfully terminate in a case where Y is monotonic in each relevant factor.

As before in the single hidden layer case, upon termination in a case where Y is monotonic in each relevant factor, the model development engine 108 can determine the VIF of the relevant factors. If any factors exhibits a VIF above a given threshold, the factor analysis may be adjusted, predictor variables may be removed from the model, or both. Any set of relevant factors can always be reduced to a first subset of relevant factors with VIF below a given threshold. In a limiting base case, only the first subset contains a single relevant factor.

Once the model development of a neural network with explanatory capabilities 500 has successfully terminated in a case where Y is monotonic in all relevant factors and all relevant factors satisfy a given VIF threshold, explanatory data can be generated using any appropriate method described next. In this example, $F_s^m$ is the value of the predictor variable $F_s$ that maximizes the risk indicator $Y=f(F_1, \ldots, F_q, \varepsilon_1, \ldots, \varepsilon_n)$ in that dimension and $\varepsilon_i^m$ is the value of $\varepsilon_i$ that maximizes the risk indicator $Y=f(F_1, \ldots, F_q,$ $\varepsilon_1, \ldots, \varepsilon_n$) in that dimension. For general neural networks without constraints, the computational complexity of generating explanatory data may result from determining $F_s^m$ (or, in aspects, involving specific factors, $\varepsilon_i^m$) in a closed form solution as a function of other input predictor variables. In one example, determining $F_s^m$ or $\varepsilon_i^m$ in a closed form solution as a function of other factors involves setting equation (12) equal to 0 and explicitly solving for $F_s^m$ (or, in some aspects, involving specific factors, $\varepsilon_i^m$). Solving for $F_s^m$ requires numerical approximation and can be dependent upon the other factors. The storage and computing requirements to generate tables of numerical approximations for $F_s^m$ or $\varepsilon_i^m$ for all combinations of the other factors can be impractical or infeasible for a processing device.

In some aspects, the model development engine 108 described herein constrains a neural network model so that all relevant factors agree with expected monotonic trends. The value $F_s^m$ or $\varepsilon_i^m$ that maximizes the risk indicator Y can be explicitly determined by one endpoint of the relevant factor's domain. Since Y is monotonic in each relevant factor, the values $F_s^m$ and, optionally, $\varepsilon_i^m$ are easily determined by the appropriate right or left endpoint of the domain of each relevant factor depending upon where the trend is monotonically increasing or decreasing.

In some aspects, the risk indicator Y is required to be monotonic in all specific factors $\varepsilon_i$ and all specific factors satisfy a given VIF threshold. In these aspects, explanatory data may be generated using, for example, one or more methods described above in the section "Explanatory Data Examples Generated from Common Factors and Constant Specific Factor Values" or the section "Explanatory Data Examples Using Common Factors and Specific Factors." In other aspects, the monotonicity requirement with respect to the specific factors and the VIF threshold requirements for the specific factors are omitted. In these aspects, explanatory data may be generated using, for example, one or more methods described above in the section "Explanatory Data Examples Using Common Factors and Zero Values for All Specific Factors" or the section "Explanatory Data Examples Using Common Factors and Zero Values for Certain Specific Factors."

In some aspects, as a result of the model-optimization operations described herein, for each consumer, any suitable method referenced above can be leveraged to rank-order a number of points lost (e.g., risk-indicator decreases) for each relevant factor. Adverse action codes or other explanatory data can be associated with each relevant factor (as well as one or more predictor variables associated with the factor), and the ranking can correctly assign the key reason codes to each consumer.

The model development engine 108 can thus reduce the amount of computational complexity such that the same neural network model can be used by a computer-implemented algorithm to determine a credit score and the adverse action codes that are associated with the credit score. In prior solutions, the computational complexity involved in generating a neural network model that can be used for both determining credit scores and adverse action codes may be too high to use a computer-implemented algorithm using such a neural network model. Thus, in prior solutions, it may be computationally inefficient or computationally infeasible to use the same neural network to identify adverse action codes and generate a credit score. For example, a data set used to generate credit scores may involve financial records associated with millions of consumers. Numerically approximating the location of each consumer's global maximum score is computationally intractable using current technology in a run-time environment.

Computing Environment Example for Optimization Operations

Figure 6:
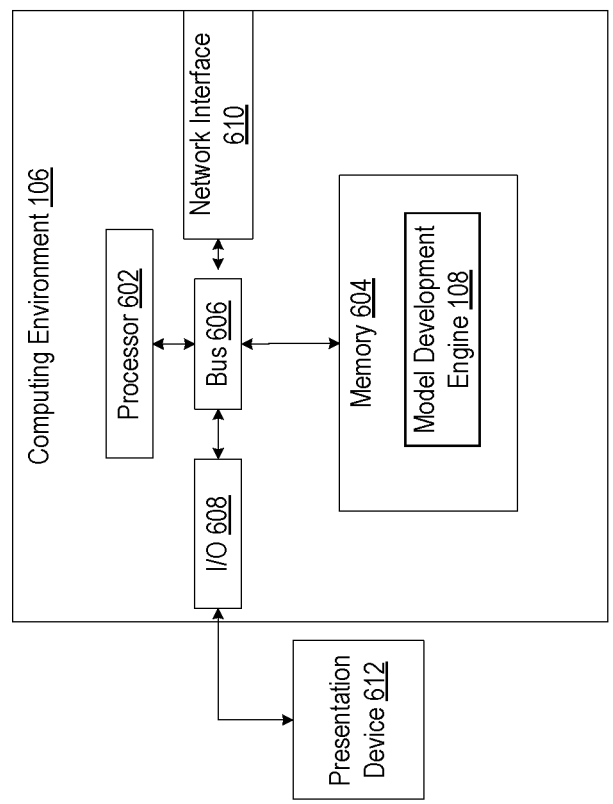
FIG. 6 is a block diagram depicting an example of a computing system that can be used to execute a model development engine for optimizing a neural network or other automated modeling algorithm, according to certain aspects of the present disclosure.

Any suitable computing system or group of computing systems can be used to perform the model optimization operations described herein. For example, FIG. 6 is a block diagram depicting an example of a computing environment 106. The example of the computing environment 106 can include various devices for communicating with other devices in the operating environment 100, as described with respect to FIG. 1. The computing environment 106 can include various devices for performing one or more transformation operations described above with respect to FIGS. 1-5.

The computing environment 106 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing environment 106 may also include a number of external or internal devices such as input or output devices. For example, the computing environment 106 is shown with an input/output interface 608 that can receive input from input devices or provide output to output devices. A bus 606 can also be included in the computing environment 106. The bus 606 can communicatively couple one or more components of the computing environment 106.

The computing environment 106 can execute program code that includes the model development engine 108. The program code for the model development engine 108 may be resident in any suitable computer-readable medium and may be executed on any suitable processing device. For example, as depicted in FIG. 6, the program code for the model development engine 108 can reside in the memory 604 at the computing environment 106. Executing the model development engine 108 can configure the processor 602 to perform the operations described herein.

In some aspects, the computing environment 106 can include one or more output devices. One example of an output device is the network interface device 610 depicted in FIG. 6. A network interface device 610 can include any device or group of devices suitable for establishing a wired or wireless data connection to one or more data networks 104. Non-limiting examples of the network interface device 610 include an Ethernet network adapter, a modem, etc. Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
a processing device; and
a memory device in which instructions executable by the processing device are stored for causing the processing device to:
identify predictor variables in which a monotonic relationship exists between each predictor variable and an outcome, wherein each predictor variable corresponds to an action performed by an entity,
generate a neural network that includes one or more hidden layers for determining a relationship between each predictor variable and a risk indicator, wherein the risk indicator indicates a level of risk associated with the entity,
determine common factors by performing a factor analysis on the predictor variables, wherein each common factor is a single variable indicating a respective relationship among a respective subset of the predictor variables,
iteratively adjust the neural network so that (i) a monotonic relationship exists between each common factor and the risk indicator as determined by the neural network and (ii) a respective variance inflation factor for each common factor is below a threshold, wherein each variance inflation factor indicates multicollinearity among the respective subset of the predictor variables corresponding to the common factor,
determine specific factors by performing the factor analysis on the predictor variables, wherein each specific factor includes unique information associated with a respective predictor variable, wherein the unique information is not included in common factors corresponding to the respective predictor variable,
iteratively adjust the neural network so that (i) a monotonic relationship exists between each specific factor and the risk indicator as determined by the neural network and (ii) a respective additional variance inflation factor for each specific factor is within a specific factor threshold, and
output, based on the adjusted neural network, explanatory data indicating relationships between (i) changes in the risk indicator and (ii) changes in at least some of the common factors.

2. The system of claim 1, wherein the processing device is further configured to generate the explanatory data by performing operations comprising:
identifying a risk-assessment function having (i) the common factors and the specific factors as inputs and (ii) the risk indicator as an output;

computing risk-indicator decreases for the common factors, wherein the processing device is configured to compute each risk-indicator decrease by:
- determining a respective maximum value of the risk indicator using (i) constant values for the specific factors and (ii) a value of a respective common factor that maximizes the risk-assessment function,
- determining a respective decreased value of the risk indicator using (i) the constant values for the specific factors and (ii) a value of the respective common factor for the entity, and
- determining the risk-indicator decrease from a difference between the respective maximum value and the respective decreased value; and generating the explanatory data from a subset of the risk-indicator decreases having the largest values.

3. The system of claim 1, wherein the processing device is further configured to generate the explanatory data by performing operations comprising:
- identifying a risk-assessment function having (i) the common factors and the specific factors as inputs and (ii) the risk indicator as an output;
- computing risk-indicator decreases, wherein the risk-indicator decreases comprise (i) first risk-indicator decreases for the common factors and (ii) second risk-indicator decreases for the specific factors; and
- generating the explanatory data from a subset of the risk-indicator decreases having the largest values,
- wherein the processing device is configured to compute each first risk-indicator decrease by:
  - determining a respective maximum value of the risk indicator using (i) a value of a respective common factor that maximizes the risk-assessment function and (ii) constant values for the specific factors,
  - determining a respective decreased value of the risk indicator using (i) a value of the respective common factor for the entity and (ii) the constant values for the specific factors, and
  - determining the first risk-indicator decrease from a difference between the respective maximum value and the respective decreased value,
- wherein the processing device is configured to compute each second risk-indicator decrease by:
  - determining a respective maximum value of the risk indicator using (i) a value of a respective specific factor that maximizes the risk-assessment function and (ii) constant values for the common factors,
  - determining a respective decreased value of the risk indicator using (i) a different value of the respective specific factor and (ii) the constant values for the common factors, and
  - determining the second risk-indicator decrease from a difference between the respective maximum value and the respective decreased value;
- wherein the processing device is configured to use a subset of the risk-indicator decreases having the largest values to generate the explanatory data.

4. The system of claim 3, wherein the processing device is configured to adjust the neural network by eliminating connections in the neural network involving at least one of:
- relationships not in accordance with an expected trend between specific factors and the risk indicator as determined by the neural network; or
- excessive variance inflation factors that exceed an additional threshold.

5. The system of claim 1, wherein the processing device is further configured to generate the explanatory data by performing operations comprising:
- identifying a risk-assessment function having (i) the common factors and the specific factors as inputs and (ii) the risk indicator as an output;
- assigning zero-values to the specific factors;
- computing risk-indicator decreases for the common factors wherein the processing device is configured to compute each risk-indicator decrease by:
  - determining a respective maximum value of the risk indicator using (i) a value of a respective common factor that maximizes the risk-assessment function and (ii) the zero-values for the specific factors,
  - determining a respective decreased value of the risk indicator using (i) a value of the respective common factor for the entity and (ii) the zero-values for the specific factors, and
  - determining the risk-indicator decrease from a difference between the respective maximum value and the respective decreased value; and
- generating the explanatory data from a subset of the risk-indicator decreases having the largest values.

6. The system of claim 1, wherein the processing device is further configured to generate the explanatory data by performing operations comprising:
- identifying a risk-assessment function having (i) the common factors and the specific factors as inputs and (ii) the risk indicator as an output;
- assigning zero-values to a first subset of the specific factors having relationships with respect to the risk indicator not in accordance with an expected trend;
- computing risk-indicator decreases, wherein the risk-indicator decreases comprise (i) first risk-indicator decreases for the common factors and (ii) second risk-indicator decreases for a second subset of the specific factors; and
- generating the explanatory data from a subset of the risk-indicator decreases having the largest values,
- wherein the processing device is configured to compute each first risk-indicator decrease by:
  - determining a respective maximum value of the risk indicator using (i) a value of a respective common factor that maximizes the risk-assessment function, (ii) the zero-values for the first subset of the specific factors, and (iii) constant values for the second subset of the specific factors,
  - determining a respective decreased value of the risk indicator using (i) a value of the respective common factor for the entity, (ii) the zero-values for the first subset of the specific factors, and (iii) constant values for the second subset of the specific factors,
  - determining the first risk-indicator decrease from a difference between the respective maximum value and the respective decreased value,
- wherein the processing device is configured to compute each second risk-indicator decrease by:
  - determining a respective maximum value of the risk indicator using (i) constant values for the common factors, (ii) zero values for the first subset of the specific factors, and (iii) a value of a respective specific factor, from the second subset of the specific factors, that maximizes the risk-assessment function,
  - determining a respective decreased value of the risk indicator using (i) the constant values for the common factors, (ii) zero values for the first subset of the specific factors, and (iii) a value of the respective specific factor for the entity that is selected from the second subset of the specific factors, and determining the second risk-indicator decrease from a difference between the respective maximum value and the respective decreased value; and wherein the processing device is configured to use a subset of the risk-indicator decreases having the largest values to generate the explanatory data.

7. A method comprising:

identifying, by a processing device, predictor variables in which a monotonic relationship exists between each predictor variable and an outcome, wherein each predictor variable corresponds to an action performed by an entity;

generating, by the processing device, a neural network that includes one or more hidden layers for determining a relationship between each predictor variable and a risk indicator, wherein the risk indicator indicates a level of risk associated with the entity;

determining, by the processing device, common factors by performing a factor analysis on the predictor variables, wherein each common factor is a single variable indicating a respective relationship among a respective subset of the predictor variables;

iteratively adjusting, by the processing device, the neural network so that (i) a monotonic relationship exists between each common factor and the risk indicator as determined by the neural network and (ii) a respective variance inflation factor for each common factor is below a threshold, wherein each variance inflation factor indicates multicollinearity among the respective subset of the predictor variables corresponding to the common factor;

determining specific factors by performing the factor analysis on the predictor variables, wherein each specific factor includes unique information associated with a respective predictor variable, wherein the unique information is not included in common factors corresponding to the respective predictor variable;

iteratively adjusting the neural network so that (i) a monotonic relationship exists between each specific factor and the risk indicator as determined by the neural network and (ii) a respective additional variance inflation factor for each specific factor is within a specific factor threshold; and outputting, by the processing device and based on the adjusted neural network, explanatory data indicating relationships between (i) changes in the risk indicator and (ii) changes in at least some of the common factors.

8. The method of claim 7, wherein generating the explanatory data comprises:

identifying a risk-assessment function having (i) the common factors and the specific factors as inputs and (ii) the risk indicator as an output;

computing risk-indicator decreases for the common factors, wherein computing each risk-indicator decrease comprises:

determining a respective maximum value of the risk indicator using (i) constant values for the specific factors and (ii) a value of a respective common factor that maximizes the risk-assessment function, determining a respective decreased value of the risk indicator using (i) the constant values for the specific factors and (ii) a value of the respective common factor for the entity, and determining the risk-indicator decrease from a difference between the respective maximum value and the respective decreased value; and generating the explanatory data from a subset of the risk-indicator decreases having the largest values.

9. The method of claim 7, wherein generating the explanatory data comprises:

identifying a risk-assessment function having (i) the common factors and the specific factors as inputs and (ii) the risk indicator as an output;

computing risk-indicator decreases, wherein the risk-indicator decreases comprise (i) first risk-indicator decreases for the common factors and (ii) second risk-indicator decreases for the specific factors; and generating the explanatory data from a subset of the risk-indicator decreases having the largest values, wherein computing each first risk-indicator decrease comprises:

determining a respective maximum value of the risk indicator using (i) a value of a respective common factor that maximizes the risk-assessment function and (ii) constant values for the specific factors, determining a respective decreased value of the risk indicator using (i) a value of the respective common factor for the entity and (ii) the constant values for the specific factors, and determining the first risk-indicator decrease from a difference between the respective maximum value and the respective decreased value, wherein computing each second risk-indicator decrease comprises:

determining a respective maximum value of the risk indicator using (i) a value of a respective specific factor that maximizes the risk-assessment function and (ii) constant values for the common factors, determining a respective decreased value of the risk indicator using (i) a different value of the respective specific factor and (ii) the constant values for the common factors, and determining the second risk-indicator decrease from a difference between the respective maximum value and the respective decreased value; and wherein a subset of the risk-indicator decreases having the largest values is used to generate the explanatory data.

10. The method of claim 9, wherein adjusting the neural network comprises eliminating connections in the neural network involving at least one of:

relationships not in accordance with an expected trend between specific factors and the risk indicator as determined by the neural network; or excessive variance inflation factors that exceed an additional threshold.

11. The method of claim 7, wherein generating the explanatory data comprises:

identifying a risk-assessment function having (i) the common factors and the specific factors as inputs and (ii) the risk indicator as an output;

assigning zero-values to the specific factors;

computing risk-indicator decreases for the common factors wherein computing each risk-indicator decrease comprises:

determining a respective maximum value of the risk indicator using (i) a value of a respective common factor that maximizes the risk-assessment function and (ii) the zero-values for the specific factors, determining a respective decreased value of the risk indicator using (i) a value of the respective common factor for the entity and (ii) the zero-values for the specific factors, and determining the risk-indicator decrease from a difference between the respective maximum value and the respective decreased value; and generating the explanatory data from a subset of the risk-indicator decreases having the largest values.

12. The method of claim 7, wherein generating the explanatory data comprises:

identifying a risk-assessment function having (i) the common factors and the specific factors as inputs and (ii) the risk indicator as an output;

assigning zero-values to a first subset of the specific factors having relationships with respect to the risk indicator not in accordance with an expected trend;

computing risk-indicator decreases, wherein the risk-indicator decreases comprise (i) first risk-indicator decreases for the common factors and (ii) second risk-indicator decreases for a second subset of the specific factors; and generating the explanatory data from a subset of the risk-indicator decreases having the largest values, wherein computing each first risk-indicator decrease comprises:

determining a respective maximum value of the risk indicator using (i) a value of a respective common factor that maximizes the risk-assessment function, (ii) the zero-values for the first subset of the specific factors, and (iii) constant values for the second subset of the specific factors, determining a respective decreased value of the risk indicator using (i) a value of the respective common factor for the entity, (ii) the zero-values for the first subset of the specific factors, and (iii) constant values for the second subset of the specific factors, and determining the first risk-indicator decrease from a difference between the respective maximum value and the respective decreased value, wherein computing each second risk-indicator decrease comprises:

determining a respective maximum value of the risk indicator using (i) constant values for the common factors, (ii) zero values for the first subset of the specific factors, and (iii) a value of a respective specific factor, from the second subset of the specific factors, that maximizes the risk-assessment function, determining a respective decreased value of the risk indicator using (i) the constant values for the common factors, (ii) zero values for the first subset of the specific factors, and (iii) a value of the respective specific factor for the entity that is selected from the second subset of the specific factors, and determining the second risk-indicator decrease from a difference between the respective maximum value and the respective decreased value;

wherein a subset of the risk-indicator decreases having the largest values is used to generate the explanatory data.

13. The method of claim 7, wherein adjusting the neural network comprises adjusting at least one of:
a number of factors used in the factor analysis,
a rotation of the factors used in the factor analysis,
a number of nodes in a hidden layer of the neural network,
a connection in the neural network,
the predictor variables, or
a number of layers in the neural network.

14. The method of claim 7, wherein identifying the predictor variables comprises:

identifying a set of candidate predictor variables;

identifying, for each of the candidate predictor variables, a respective bivariate relationship between the candidate predictor variable and the outcome; and transforming, based on the identified bivariate relationships, the set of candidate predictor variables into the predictor variables.

15. A non-transitory computer-readable medium having program code that is executable by a processing device to perform operations, the operations comprising:

identifying predictor variables in which a monotonic relationship exists between each predictor variable and an outcome, wherein each predictor variable corresponds to an action performed by an entity;

generating a neural network that includes one or more hidden layers for determining a relationship between each predictor variable and a risk indicator, wherein the risk indicator indicates a level of risk associated with the entity;

determining common factors by performing a factor analysis on the predictor variables, wherein each common factor is a single variable indicating a respective relationship among a respective subset of the predictor variables;

iteratively adjusting the neural network so that (i) a monotonic relationship exists between each common factor and the risk indicator as determined by the neural network and (ii) a respective variance inflation factor for each common factor is below a threshold, wherein each variance inflation factor indicates multicollinearity among the respective subset of the predictor variables corresponding to the common factor;

determining specific factors by performing the factor analysis on the predictor variables, wherein each specific factor includes unique information associated with a respective predictor variable, wherein the unique information is not included in common factors corresponding to the respective predictor variable;

iteratively adjusting the neural network so that (i) a monotonic relationship exists between each specific factor and the risk indicator as determined by the neural network and (ii) a respective additional variance inflation factor for each specific factor is within a specific factor threshold; and outputting, based on the adjusted neural network, explanatory data indicating relationships between (i) changes in the risk indicator and (ii) changes in at least some of the common factors.

16. The non-transitory computer-readable medium of claim 15, wherein generating the explanatory data comprises:

identifying a risk-assessment function having (i) the common factors and the specific factors as inputs and (ii) the risk indicator as an output;

computing risk-indicator decreases for the common factors, wherein computing each risk-indicator decrease comprises:

determining a respective maximum value of the risk indicator using (i) constant values for the specific factors and (ii) a value of a respective common factor that maximizes the risk-assessment function, determining a respective decreased value of the risk indicator using (i) the constant values for the specific factors and (ii) a value of the respective common factor for the entity, and determining the risk-indicator decrease from a difference between the respective maximum value and the respective decreased value; and generating the explanatory data from a subset of the risk-indicator decreases having the largest values.

17. The non-transitory computer-readable medium of claim 15, wherein generating the explanatory data comprises:

identifying a risk-assessment function having (i) the common factors and the specific factors as inputs and (ii) the risk indicator as an output;

computing risk-indicator decreases, wherein the risk-indicator decreases comprise (i) first risk-indicator decreases for the common factors and (ii) second risk-indicator decreases for the specific factors;

generating the explanatory data from a subset of the risk-indicator decreases having the largest values, wherein computing each first risk-indicator decrease comprises:

determining a respective maximum value of the risk indicator using (i) a value of a respective common factor that maximizes the risk-assessment function and (ii) constant values for the specific factors, determining a respective decreased value of the risk indicator using (i) a value of the respective common factor for the entity and (ii) the constant values for the specific factors, and determining the first risk-indicator decrease from a difference between the respective maximum value and the respective decreased value, wherein computing each second risk-indicator decrease comprises:

determining a respective maximum value of the risk indicator using (i) a value of a respective specific factor that maximizes the risk-assessment function and (ii) constant values for the common factors, determining a respective decreased value of the risk indicator using (i) a different value of the respective specific factor and (ii) the constant values for the common factors, and determining the second risk-indicator decrease from a difference between the respective maximum value and the respective decreased value.

18. The non-transitory computer-readable medium of claim 17, wherein adjusting the neural network comprises eliminating connections in the neural network involving at least one of:

relationships not in accordance with an expected trend between specific factors and the risk indicator as determined by the neural network; or excessive variance inflation factors that exceed an additional threshold.

19. The non-transitory computer-readable medium of claim 15, wherein generating the explanatory data comprises:

identifying a risk-assessment function having (i) the common factors and the specific factors as inputs and (ii) the risk indicator as an output;

assigning zero-values to the specific factors;

computing risk-indicator decreases for the common factors wherein computing each risk-indicator decrease comprises:

determining a respective maximum value of the risk indicator using (i) a value of a respective common factor that maximizes the risk-assessment function and (ii) the zero-values for the specific factors, determining a respective decreased value of the risk indicator using (i) a value of the respective common factor for the entity and (ii) the zero-values for the specific factors, and determining the risk-indicator decrease from a difference between the respective maximum value and the respective decreased value; and generating the explanatory data from a subset of the risk-indicator decreases having the largest values.

20. The non-transitory computer-readable medium of claim 15, wherein generating the explanatory data comprises:

identifying a risk-assessment function having (i) the common factors and the specific factors as inputs and (ii) the risk indicator as an output;

assigning zero-values to a first subset of the specific factors having relationships with respect to the risk indicator not in accordance with an expected trend;

computing risk-indicator decreases, wherein the risk-indicator decreases comprise (i) first risk-indicator decreases for the common factors and (ii) second risk-indicator decreases for a second subset of the specific factors; and generating the explanatory data from a subset of the risk-indicator decreases having the largest values, wherein computing each first risk-indicator decrease comprises:

determining a respective maximum value of the risk indicator using (i) a value of a respective common factor that maximizes the risk-assessment function, (ii) the zero-values for the first subset of the specific factors, and (iii) constant values for the second subset of the specific factors, determining a respective decreased value of the risk indicator using (i) a value of the respective common factor for the entity, (ii) the zero-values for the first subset of the specific factors, and (iii) constant values for the second subset of the specific factors, and determining the first risk-indicator decrease from a difference between the respective maximum value and the respective decreased value, wherein computing each second risk-indicator decrease comprises:

determining a respective maximum value of the risk indicator using (i) constant values for the common factors, (ii) zero values for the first subset of the specific factors, and (iii) a value of a respective specific factor, from the second subset of the specific factors, that maximizes the risk-assessment function, determining a respective decreased value of the risk indicator using (i) the constant values for the common factors, (ii) zero values for the first subset of the specific factors, and (iii) a value of the respective specific factor for the entity that is selected from the second subset of the specific factors, and determining the second risk-indicator decrease from a difference between the respective maximum value and the respective decreased value.

* * * * *